US 8,189,449 B2

(12) United States Patent
Fujii et al.

(10) Patent No.: US 8,189,449 B2
(45) Date of Patent: May 29, 2012

(54) MULTILAYER OPTICAL INFORMATION MEDIUM AND OPTICAL INFORMATION PROCESSING APPARATUS THEREFOR, PROGRAM PRODUCT AND INFORMATION MEDIUM INCLUDING THE SAME

(75) Inventors: Toshishige Fujii, Kanagawa (JP); Masaetsu Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 215 days.

(21) Appl. No.: 12/298,346

(22) PCT Filed: Mar. 5, 2008

(86) PCT No.: PCT/JP2008/054435
§ 371 (c)(1),
(2), (4) Date: Oct. 24, 2008

(87) PCT Pub. No.: WO2008/111592
PCT Pub. Date: Sep. 18, 2008

(65) Prior Publication Data
US 2010/0172231 A1  Jul. 8, 2010

(30) Foreign Application Priority Data

Mar. 7, 2007 (JP) ................................ 2007-057212
Oct. 22, 2007 (JP) ................................ 2007-273741

(51) Int. Cl.
*G11B 7/00*  (2006.01)
*G11B 7/24*  (2006.01)
*G11B 3/70*  (2006.01)
*G11B 5/84*  (2006.01)
*G11B 7/26*  (2006.01)

(52) U.S. Cl. ................. 369/124.08; 369/283; 369/275.4; 369/94

(58) Field of Classification Search ............. 369/124.08, 369/283, 275.4, 275.1, 275.3
See application file for complete search history.

(56) References Cited

U.S. PATENT DOCUMENTS

| 5,406,534 A | 4/1995 | Hisakado et al. |
| 5,418,774 A | 5/1995 | O'Hara et al. |
| 5,881,032 A * | 3/1999 | Ito et al. ........................ 369/30.1 |

(Continued)

FOREIGN PATENT DOCUMENTS

EP  0 449 121 A2  10/1991

(Continued)

OTHER PUBLICATIONS

DVD Forum News, vol. 23 Oct. 2004 pp. 4-9.

*Primary Examiner* — Joseph Haley
*Assistant Examiner* — Nicholas Lee
(74) *Attorney, Agent, or Firm* — Dickstein Shapiro LLP

(57) ABSTRACT

A disclosed multilayer optical information medium includes three or more information layers. Address information indicating positions in each of the information layers is recorded in a helical manner. The information layers comprise at least one I to O layer in which values representing addresses in the address information increase from an inner perimeter section toward an outer perimeter section, and at least one O to I layer in which the values representing the addresses in the address information increase from the outer perimeter section toward the inner perimeter section. All of the I to O layers have substantially the same address information and all of the O to I layers have substantially the same address information. Layer specifying information specifying the information layer is attached to the address information.

15 Claims, 14 Drawing Sheets

U.S. PATENT DOCUMENTS

| | | |
|---|---|---|
| 2004/0265532 A1 | 12/2004 | Sasa et al. |
| 2005/0041546 A1* | 2/2005 | Suzuki ........................ 369/47.27 |
| 2006/0003136 A1 | 1/2006 | Sasa et al. |
| 2006/0098558 A1* | 5/2006 | Kobayashi et al. ........ 369/275.1 |
| 2006/0222810 A1 | 10/2006 | Hayashi et al. |
| 2007/0114129 A1 | 5/2007 | Hayashi et al. |
| 2007/0237064 A1 | 10/2007 | Fujii et al. |

FOREIGN PATENT DOCUMENTS

| | | |
|---|---|---|
| EP | 1 056 089 A1 | 11/2000 |
| EP | 1 128 383 A2 | 8/2001 |
| EP | 1607949 | 12/2005 |
| JP | 2000-293889 | 10/2000 |
| JP | 2000-293947 | 10/2000 |
| JP | 2004-295950 | 10/2004 |
| JP | 2008-90964 | 4/2008 |
| WO | WO 97/15050 | 4/1997 |
| WO | WO 03/100702 | 12/2003 |
| WO | WO-2004/086403 A1 | 10/2004 |
| WO | WO-2006/067666 A2 | 6/2006 |

* cited by examiner

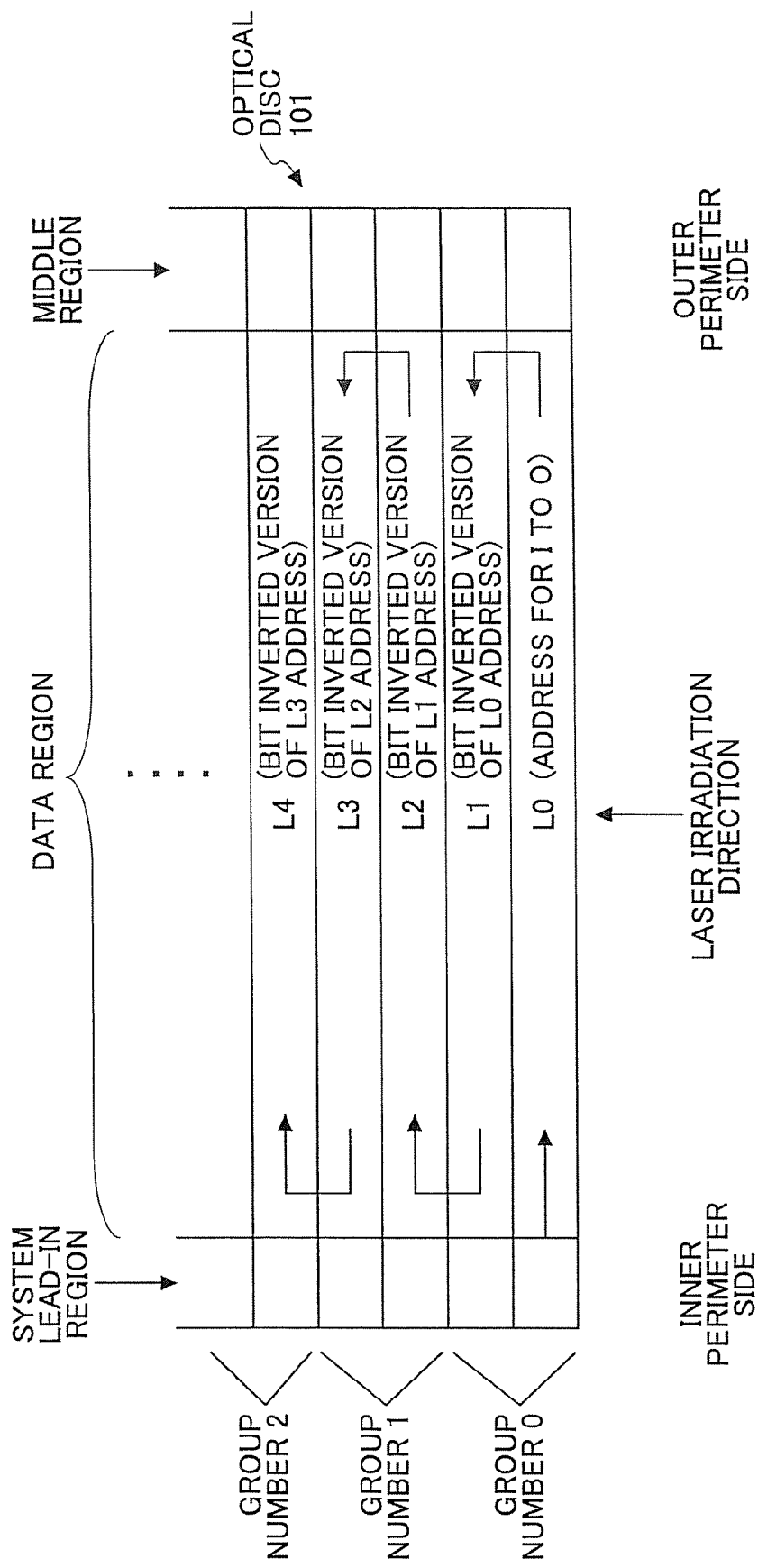

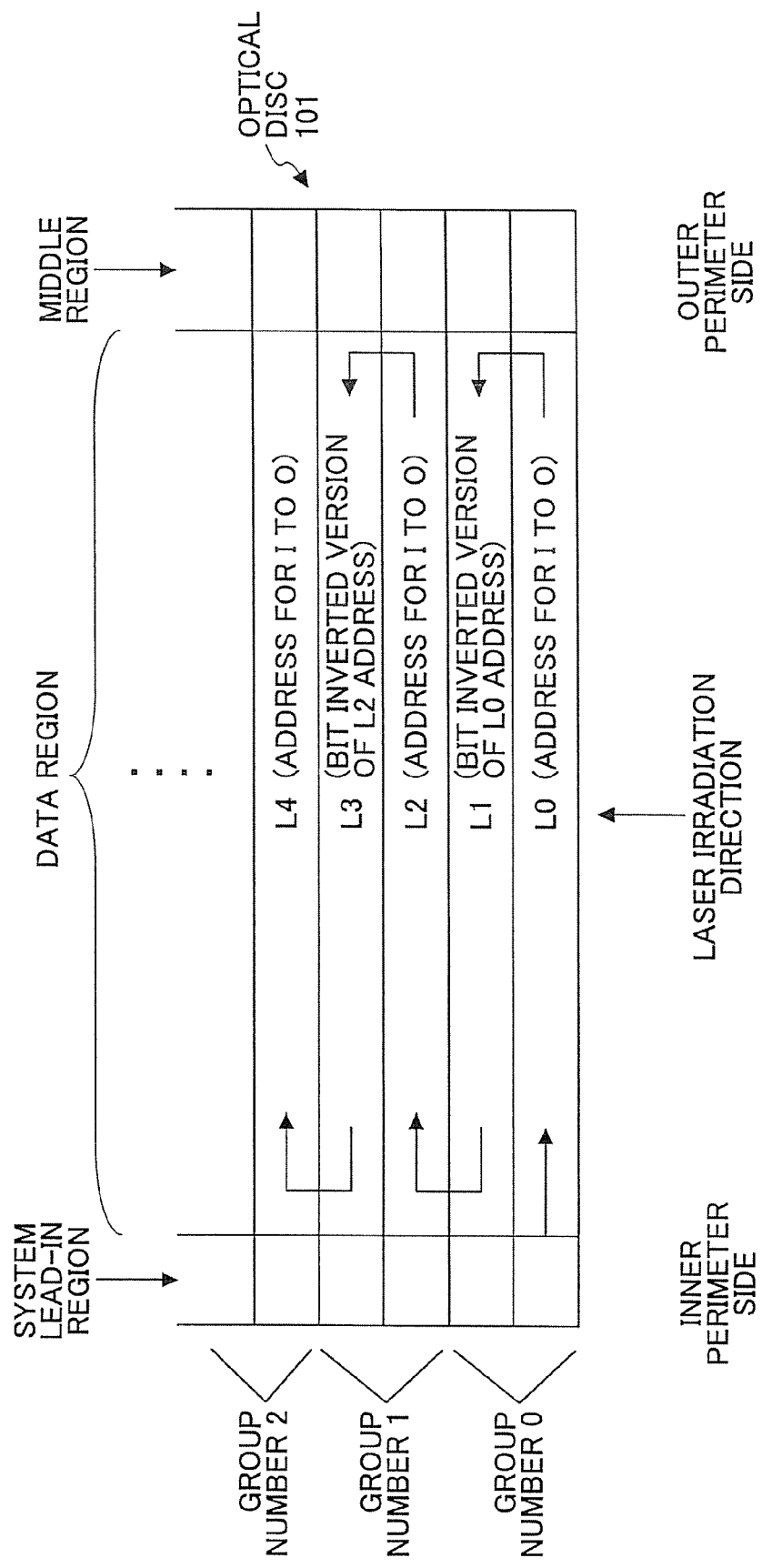

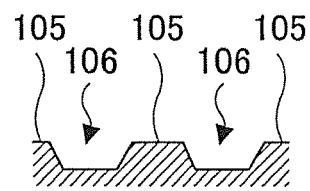
FIG.8A
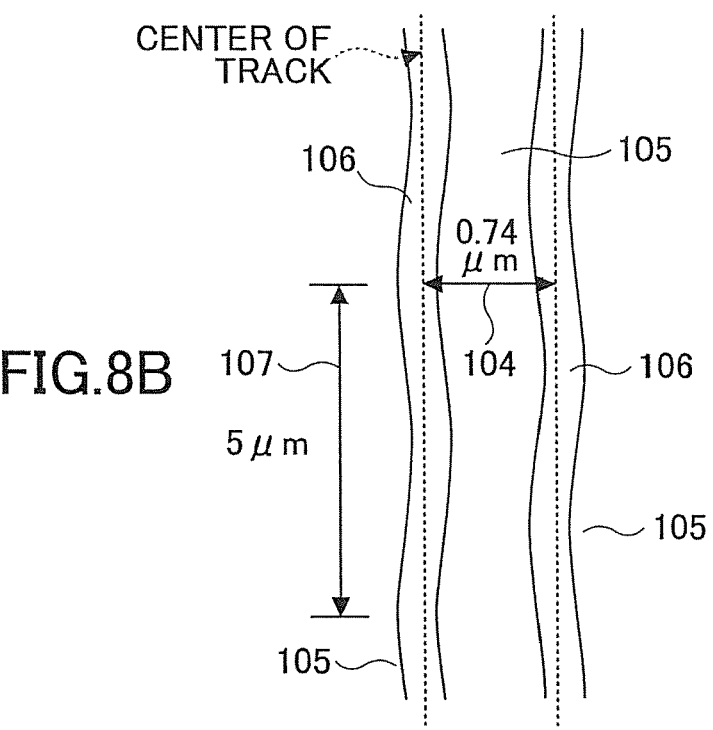
FIG.8B
FIG.9
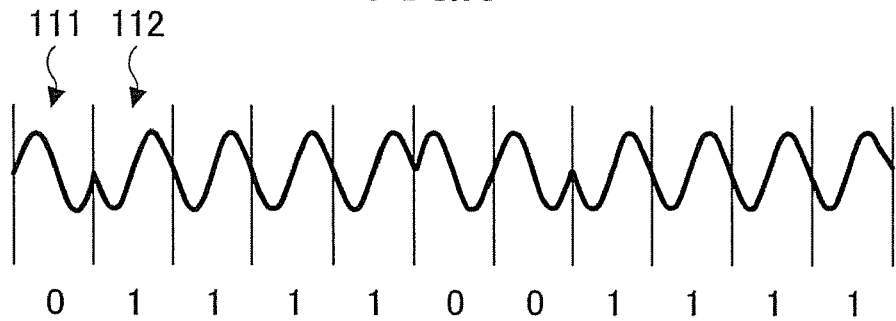

FIG.10

| PSN | 030000 | 030001 | 030002 | 030003 | 030004 | ... | 03000B | 03000C | 03000D | 03000E | 03000F |
|---|---|---|---|---|---|---|---|---|---|---|---|
| ADIP | 00C000 | | | | 00C001 | ... | 00C002 | | | | 00C003 |

MULTILAYER OPTICAL INFORMATION MEDIUM AND OPTICAL INFORMATION PROCESSING APPARATUS THEREFOR, PROGRAM PRODUCT AND INFORMATION MEDIUM INCLUDING THE SAME

TECHNICAL FIELD

The present invention relates to a multilayer optical information medium and an optical information processing apparatus therefor, and a program product and an information medium including the same.

BACKGROUND ART

In an optical disc such as a DVD, the total storage capacity can be increased by providing two or more recording layers. To perform recording and reproducing operations, the optical disc is accessed from one side, and the focal point of an optical light beam from an optical head (pickup) is irradiated onto each of the recording layers. Accordingly, large-capacity recording/reproducing can be performed without turning the optical disc over. Particularly, with regard to DVDs, there are already two-layer discs that are practically being used, which are read-only type discs (ROM).

Patent document 1 discloses an optical information medium that has a multilayer structure including a first recording layer and a second recording layer. This optical information medium includes plural tracks arranged in a helical or a concentric manner, and the tracks have plural sectors. Each sector includes address information. Specifically, a first recording layer includes address information starting at 0 to (S−1) [S represents the number of sectors in each of the first recording layer and the second recording layer], and a second recording layer includes address information starting at S to (S×2−1).

Patent document 2 discloses an optical information medium that is a two-layer medium. The address information in the second layer corresponds to the bit-inverted or sign-inverted version of the address information in the first layer.

Patent document 3 describes another two-layer medium. There are address marks common to both the first recording layer and the second recording layer, which address marks are arranged according to the recession/protrusion arrangement of different pit rows. The recording layer can be identified by detecting the pattern of reproduction signals of the address marks.

In an optical disc in which information can be recorded, the address information needs to be embedded beforehand in order to identify the current position and the recording target position even when there is no information recorded.

With the technology of patent document 1, the address information is sequentially embedded starting at zero in the first recording layer, assuming that the number of sectors in the first recording layer is S. In the second recording layer, the address information starts at S. However, nothing is disclosed about the specific optical method of embedding the address information in an empty optical disc. Furthermore, the optical format in which the address information is embedded needs to be a format that does not interfere with signals of the recording data (data to be recorded or data that have been recorded are hereinafter referred to as "recording data") after the data are recorded. However, nothing is disclosed about this point either.

Furthermore, when the number of sectors S of the first recording layer varies according to the optical disc (for example, in a case where the disc system is different or the number of tracks is different, and therefore the storage capacity per layer varies according to the optical disc), the address information at which the second recording layer starts will not be known. Thus, the address information in the radial direction of the optical disc cannot be calculated only from the address information of the second recording layer. However, nothing is disclosed about this point either.

Furthermore, patent document 2 discloses a technology of allocating address information for a two layer optical information medium. However, nothing is specifically disclosed about allocating address information of a multilayer optical information medium including three or more layers.

In the invention disclosed in patent document 3, the address information is common to both layers, but the two layers have pit rows with different physical recessions/protrusions, and therefore the address information of the two layers can be distinguished. However, this invention is not applicable to a multilayer medium including three or more layers.

Patent document 1: Japanese Laid-Open Patent Application No. 2000-293947
Patent document 2: Japanese Laid-Open Patent Application No. 2004-295950
Patent document 3: Japanese Laid-Open Patent Application No. 2000-293889

Accordingly, there is a need for a multilayer optical information medium and an optical information processing apparatus therefor, and a program product and an information medium including the same, with which the address information in each information layer (recording layer) can be easily acquired for multilayer optical information media having various numbers of laminated information layers (recording layers).

DISCLOSURE OF THE INVENTION

The present invention provides a multilayer optical information medium and an optical information processing apparatus therefor, and a program product and an information medium including the same, in which one or more of the above-described disadvantages are eliminated.

An embodiment of the present invention provides a multilayer optical information medium including three or more information layers, wherein address information indicating positions in each of the information layers is recorded in a helical manner; the information layers include at least one I to O layer in which values representing addresses in the address information increase from an inner perimeter section toward an outer perimeter section, and at least one O to I layer in which the values representing the addresses in the address information increase from the outer perimeter section toward the inner perimeter section; all of the I to O layers have substantially the same address information and all of the O to I layers have substantially the same address information; and layer specifying information specifying the information layer is attached to the address information.

According to one embodiment of the present invention, a multilayer optical information medium and an optical information processing apparatus therefor, and a program product and an information medium including the same are provided, with which the address information in each information layer can be easily acquired for multilayer optical information media having various numbers of laminated information layers.

BRIEF DESCRIPTION OF THE DRAWINGS

FIG. 6 illustrates yet another configuration of a multilayer optical information medium according to an embodiment of the present invention;

FIG. 7 illustrates yet another configuration of a multilayer optical information medium according to an embodiment of the present invention;

FIGS. 8A and 8B illustrate guide grooves, where FIG. 8A is a cross-sectional view and FIG. 8B is a plan view;

FIG. 9 illustrates an example of wobble modulation;

FIG. 10 illustrates an example of the relationship between ADIP and PSN of recording data;

BEST MODE FOR CARRYING OUT THE INVENTION

A description is given, with reference to the accompanying drawings, of embodiments of the present invention. However, the present invention is not limited to these embodiments. Of particular note is that although the following describes a conventional DVD, the present invention is also applicable to a blue-laser high-density next-generation optical information recording medium.

In the description below, the following suffixes and symbols are used.

For example, in "12BDh", the suffix "h" denotes a hexadecimal number, and therefore this example indicates that "12BD" is a hexadecimal number. In "0010b", the suffix "b" denotes a binary number, and therefore this example indicates that "0010" is a binary number. In "1234d", the suffix "d" denotes a decimal number, and therefore this example indicates that "1234" is a decimal number. The symbol "*" denotes multiplication and the symbol "/" denotes division.

First Embodiment

Figure 1:
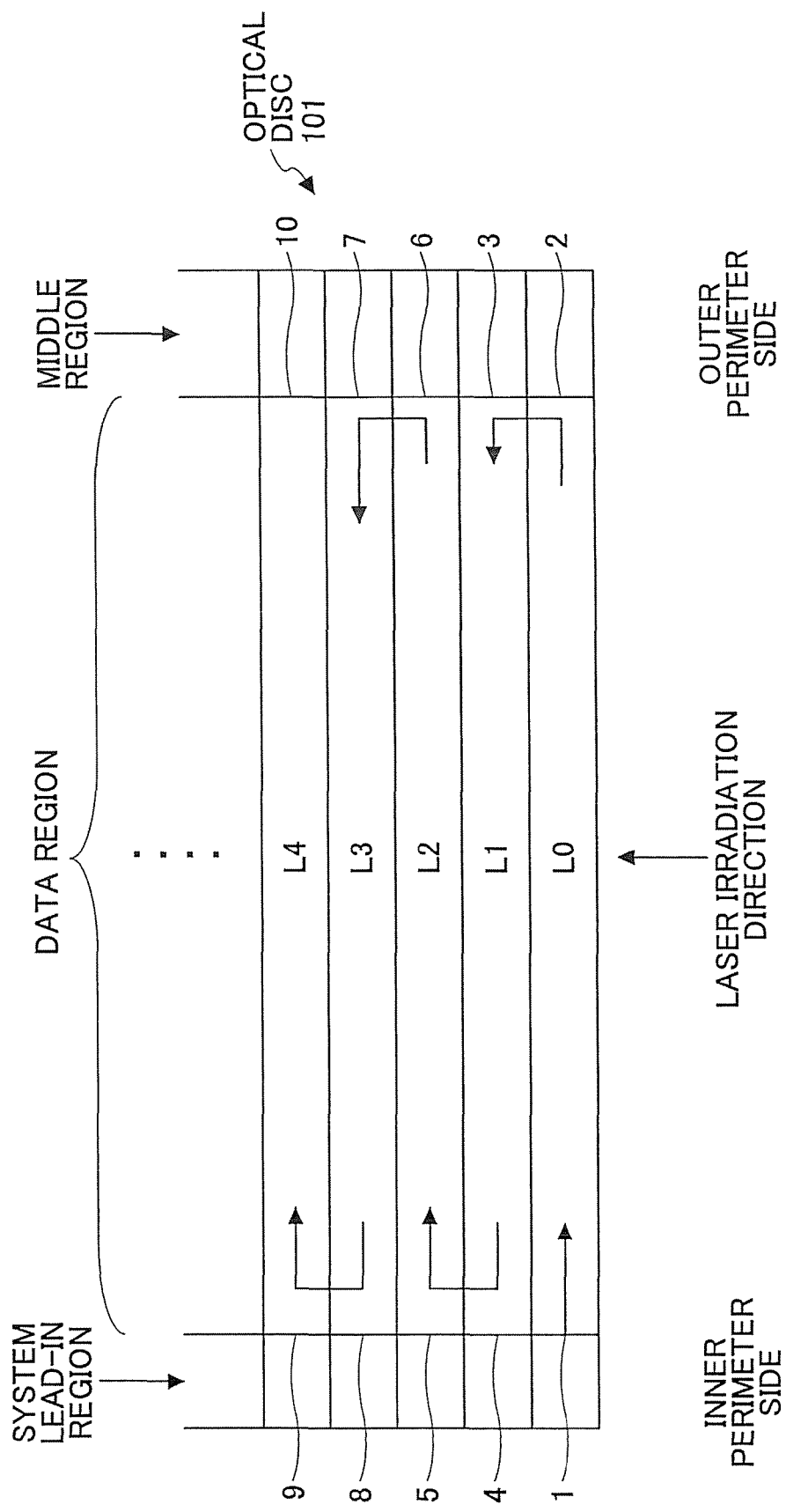
FIG. 1 illustrates a configuration of a multilayer optical information medium according to an embodiment of the present invention.

FIG. 1 illustrates a configuration of a multilayer optical information medium according to an embodiment of the present invention. In this example, the present invention is applied to a DVD (Digital Versatile Disc) having a multilayer structure of information layers.

The layers are named Layer0, Layer1, Layer2 . . . (hereinafter, "L0, L1, L2 . . . "), beginning at the side of an optical disc 101 that receives irradiation of a laser beam. However, the order of naming the layers, the order of reading the layers, and the order of recording in the layers can begin at the other side.

For example, the operation of reading or writing data starts at the innermost perimeter 1 of the layer L0, proceeding along a helix toward the outer perimeter (I to O layer). For example, when the position of reading or writing data (reading/writing position) reaches the outermost perimeter 2 of the data region, the reading/writing position moves to a position above this, i.e., to the outermost perimeter 3 of L1. In the case of video data, which are continuously recorded or reproduced, the position of recording/reproducing data moves to L1 after reaching the outermost perimeter 2 of L0 without returning to the inner perimeter of the optical disc, and therefore the access time can be minimized. Accordingly, it is possible to prevent the video image from being discontinued due to a long access time. In a case of a sequential recording/reproducing operation, after reaching the outermost perimeter 2 of L0, the reading/writing position moves to the outermost perimeter 3 of L1, and thereafter, the tracks are tracked toward the inner perimeter of L1. In L1, the reading/writing position moves from the outer perimeter toward the inner perimeter along a helix (O to I layer). When the reading/writing position reaches the innermost perimeter 4, the reading/writing position moves to the innermost perimeter 5 of L2. This is referred to as OTP (Opposite Track Path). By sequentially repeating such an operation, information can be efficiently read from or recorded in a multilayer optical information medium including three or more information layers.

With regard to address information (data address) for example, the address information of the innermost perimeter is 030000h, and the address information of the outermost perimeter is 26054Fh. The region inside 030000h is a system lead-in region, where data other than user data, such as dummy data and auxiliary data are recorded. The region outside 26054Fh is referred to as a middle region, where dummy data are recorded.

In the present embodiment, layer information for identifying each layer is added to this address information.

The method of assigning layer information and address information is described with reference to FIG. 5.

For example, there is a method of adding the layer information to a higher-order bit of the address information.

In the case of the L0 layer, "0" denoting L0 is added as layer information to a high-order bit of the address information "030000h" of the innermost perimeter 1 in the data region, so that this address is changed to "0 030000h". Similarly, the outermost perimeter 2 is changed to "0 26054Fh". The same method is applied to L2, i.e., "2" is added to a high-order bit of the address information. For example, for the innermost perimeter, the address is changed to "2 030000h".

Furthermore, all of the "I to O layers" have substantially the same address information except the layer information, and likewise, all of the "O to I layers" have substantially the same address information except the layer information. For example, for L2, the address information of the innermost perimeter 5 in the data region is "2 030000h" and the address information of the outermost perimeter 6 in the data region is "2 26054Fh", and for L4, the address information of the innermost perimeter 9 in the data region is "4 030000h" and the address information of the outermost perimeter 10 in the data region is "4 26054Fh".

In the present embodiment, bit inversion is not performed on the layer information; bit inversion is only performed on the address information. For example, the address information of the O to I layer corresponds to the bit-inverted version of the address information of the I to O layer. Specifically, the address information of the outermost perimeter 3 of the L1 layer is "1 D9FAB0h", which is the bit-inverted version of "0 26054Fh". The address information of the innermost perimeter 4 of the L1 layer is "1 FCFFFFh", which is the bit-inverted version of "0 030000h".

Accordingly, it is possible to manage access to the information layers and the timing of sending out recording data with a simple conversion process and by using the same circuit and calculation algorithm.

Incidentally, it is possible to also bit-invert the layer information, and then identify the layer information in the end, by devising another method.

Furthermore, as a matter of simplification, the layer information is described as being added to a higher-order bit of the address information. However, in the layer information of an actual medium such as a ROM medium in which information is inserted by bits, there are frames provided at the front half of the data region for describing address information. Among these frames, there is a frame for describing layer information. Therefore, there may be a case where the layer information is described in a frame different from that of the address information. The present invention includes such an embodiment.

The same effects as the above can be achieved by performing sign inversion instead of bit inversion.

The physical address number PSN (Physical Sector Number) of L1 in the optical disc 101 having an OTP format is obtained by performing a predetermined conversion method (e.g., bit inversion) on the PSN of L0 corresponding to the same radial position. That is, at the position corresponding to PSN: 030000h of L0, the PSN of L1 is FCFFFFh. When bit 23 is expressed as a sign bit by indicating a negative number with a complement of two, "−030000h" is expressed as "FD0000h", and therefore the difference is only one. Accordingly, bit inversion substantially corresponds to sign inversion by using a complement of two for the expression.

Furthermore, for example, the bit-inverted version of the address information of the O to I layer L1 can be used as the address information of the I to O layer L2 shown in FIG. 1. However, in this case, if the starting point of L0 and the ending point of L1 are at different positions, the starting point of L2 will have a starting address number different from that of the starting point of L0. Nevertheless, the I to O layers have substantially the same address information for common radial positions, which means that the I to O layers have substantially the same address information. The same applies to O to I layers.

In the above example, the information of the innermost perimeter of L1 is "1 FCFFFFh", which is obtained by bit-inverting the address information of "0 030000h" of the innermost perimeter of L0. However, due to the impact of deflection and the impact on the laser intensity caused when the laser optical path traverses the system lead-in region, there are cases where the data region ends slightly toward the outer perimeter. For example, the innermost perimeter of L1 may not end at "1 FCFFFFh", which corresponds to the bit-inverted version of the address information of "0 030000h" corresponding to the starting position of L0. Instead, the innermost perimeter of L1 may end at "1 FCFFFDh". In this case, the address information corresponding to the starting point of L2 is "2 030002h", which is obtained by bit-inverting the address information of the innermost perimeter of L1. As described above, all of the I to O layers have substantially the same address information and all of the O to I layers have substantially the same address information, but there may be slight differences. However, common radial positions have substantially the same addresses. Therefore, even if media have various numbers of information layers, by performing predetermined conversion on the address information of a certain information layer, the address information of another information layer can be easily acquired.

Furthermore, the address information of the outermost perimeter 3 of L1 does not need to be a completely bit-inverted version of the address information of the outermost perimeter 2 of L0, but can be substantially the same value as the bit-inverted value.

Second Through Fourth Embodiments

Figure 2:
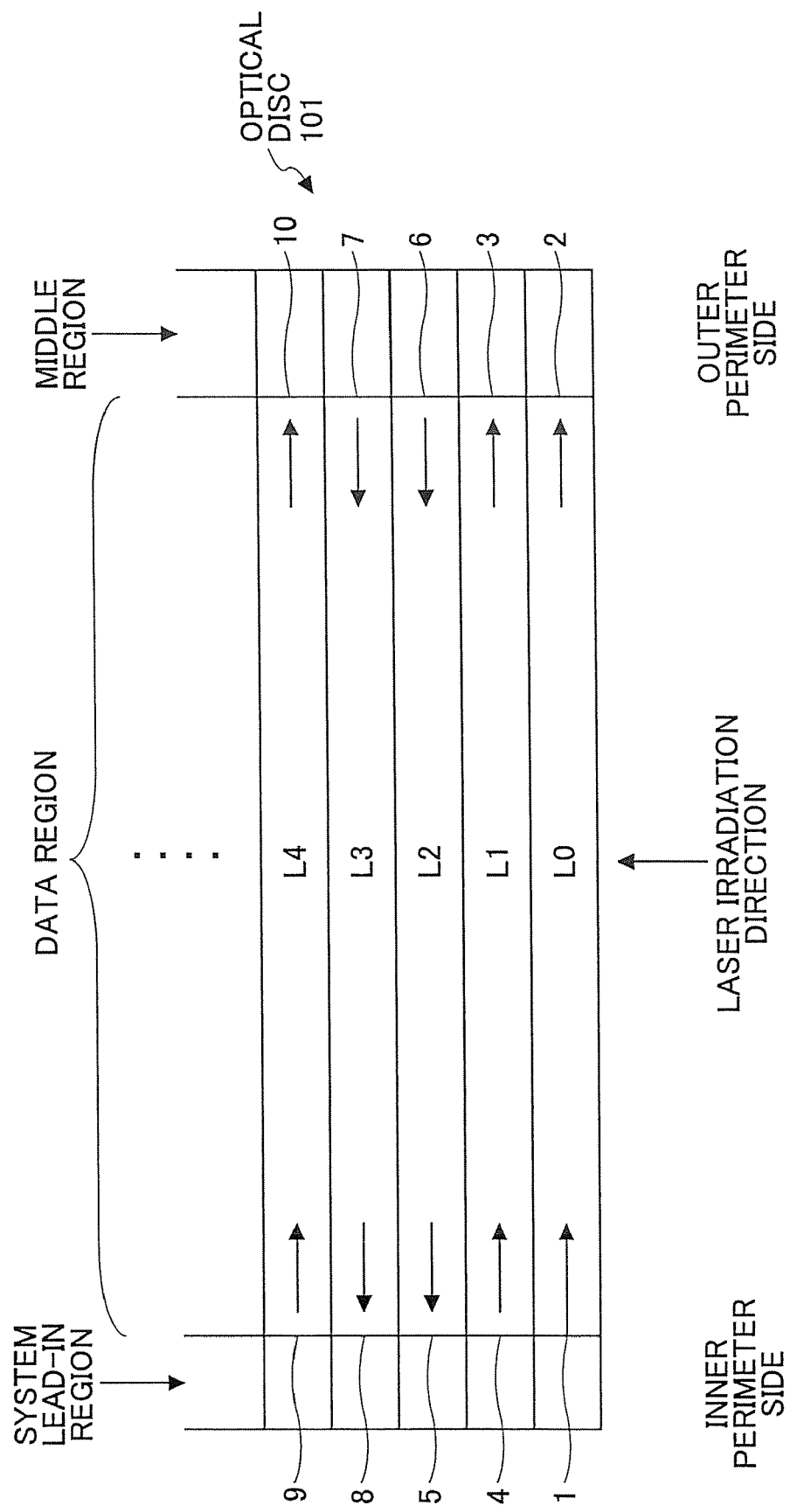
FIG. 2 illustrates another configuration of a multilayer optical information medium according to an embodiment of the present invention.
Figure 3:
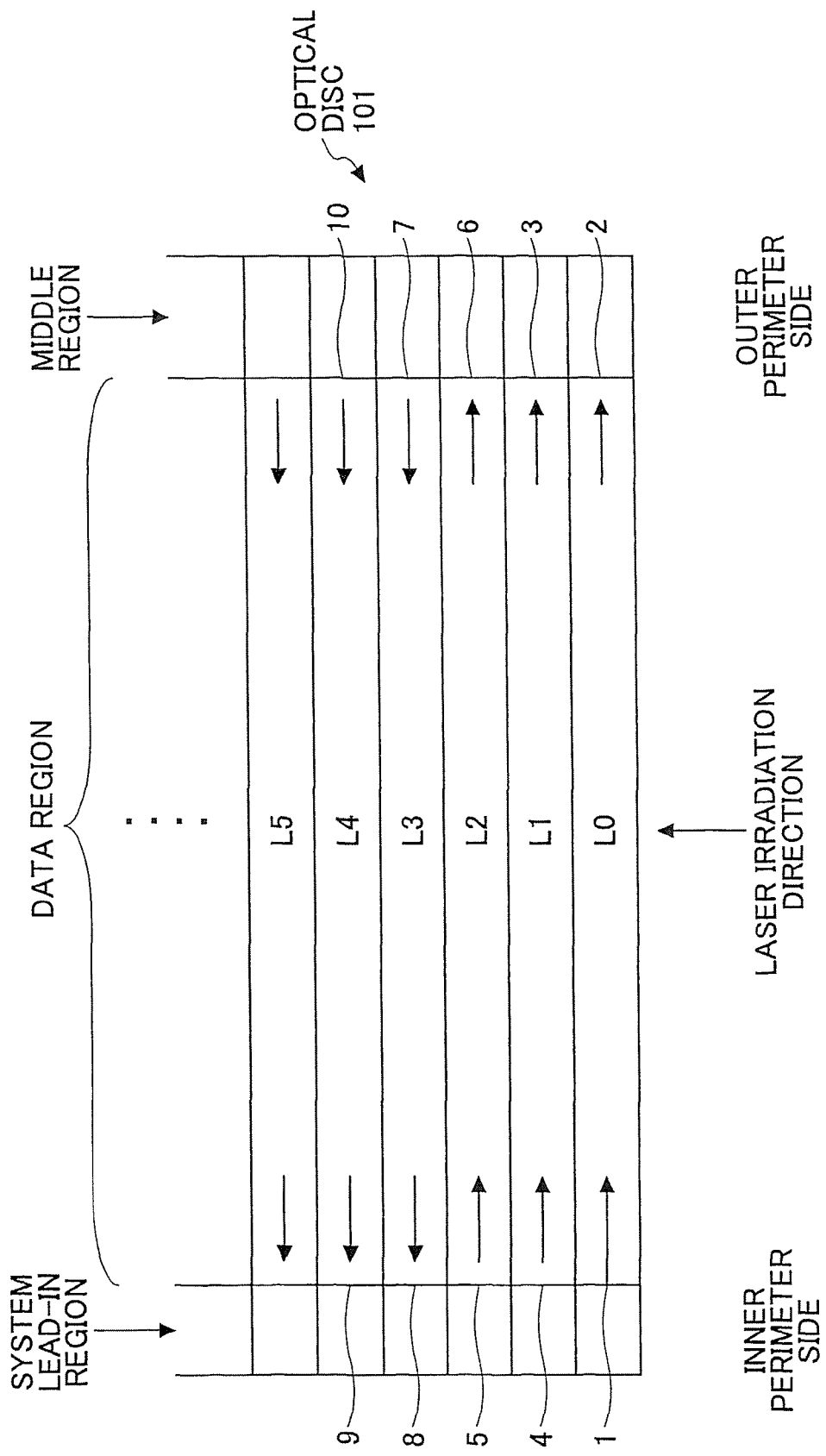
FIG. 3 illustrates yet another configuration of a multilayer optical information medium according to an embodiment of the present invention.
Figure 4:
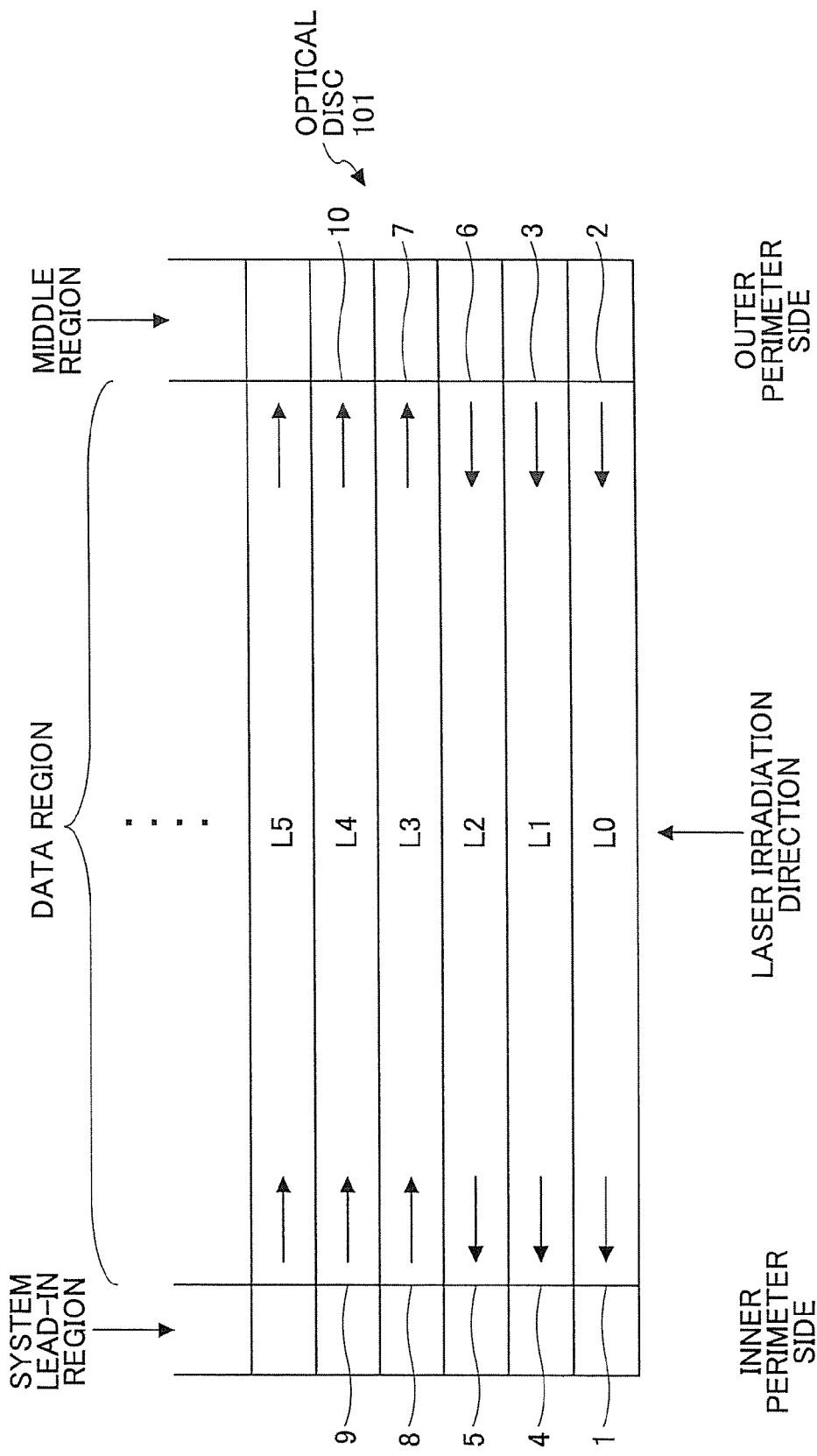
FIG. 4 illustrates yet another configuration of a multilayer optical information medium according to an embodiment of the present invention.

FIGS. 2 through 4 illustrate other configurations (second through fourth embodiments) of the multilayer optical information medium according to an embodiment of the present invention.

The layers are named Layer0, Layer1, Layer2 . . . (hereinafter, "L0, L1, L2 . . . "), beginning at the side of the optical disc 101 that receives irradiation of a laser beam. However, the order of naming the layers, the order of reading the layers, and the order of recording in the layers can begin at the other side.

First, a description is given of FIG. 2 (second embodiment).

For example, the operation of reading or writing data starts from the innermost perimeter 1 of the layer L0, proceeding along a helix toward the outer perimeter, in an I to O layer. The next layer L1 is also an I to O layer.

L2 is an O to I layer and the next layer L3 is also an O to I layer. In this manner, two consecutive I to O layers and two consecutive O to I layers are provided alternately.

With such an arrangement of layers, at some places, after the position of reading the data reaches the outer perimeter, it needs to move back once again to the inner perimeter in order to proceed to the next layer. However, layers having substantially the same radial positions with substantially the same addresses are aligned next to each other, which can be distinguished only with layer information. This may be convenient for managing addresses. Therefore, the layers can be arranged in the above-described order.

Furthermore, as shown in FIG. 3 (third embodiment), L0 through L2 can be I to O layers and L3 through L5 can be O to I layers. As shown in FIG. 4 (fourth embodiment), L0 through L2 can be O to I layers and L3 through L5 can be I to O layers.

The bit inversion is performed as follows, with reference to FIG. 2. That is, L2 is given address information that is the bit-inverted version of the address information of L0, and L3 is given address information that is the bit-inverted version of the address information of L1.

Fifth and Sixth Embodiments

FIGS. 6 and 7 illustrate other configurations (fifth and sixth embodiments) of the multilayer optical information medium according to an embodiment of the present invention. These are examples of applying the present invention to DVDs having a multilayer structure of information layers.

The layers are named Layer0, Layer1, Layer2 . . . (hereinafter, "L0, L1, L2 . . . "), beginning at the side of the optical disc 101 that receives irradiation of a laser beam. However, the order of naming the layers, the order of reading the layers, and the order of recording in the layers can begin at the other side.

First, a description is given of FIG. 6 (fifth embodiment).

Figure 5:
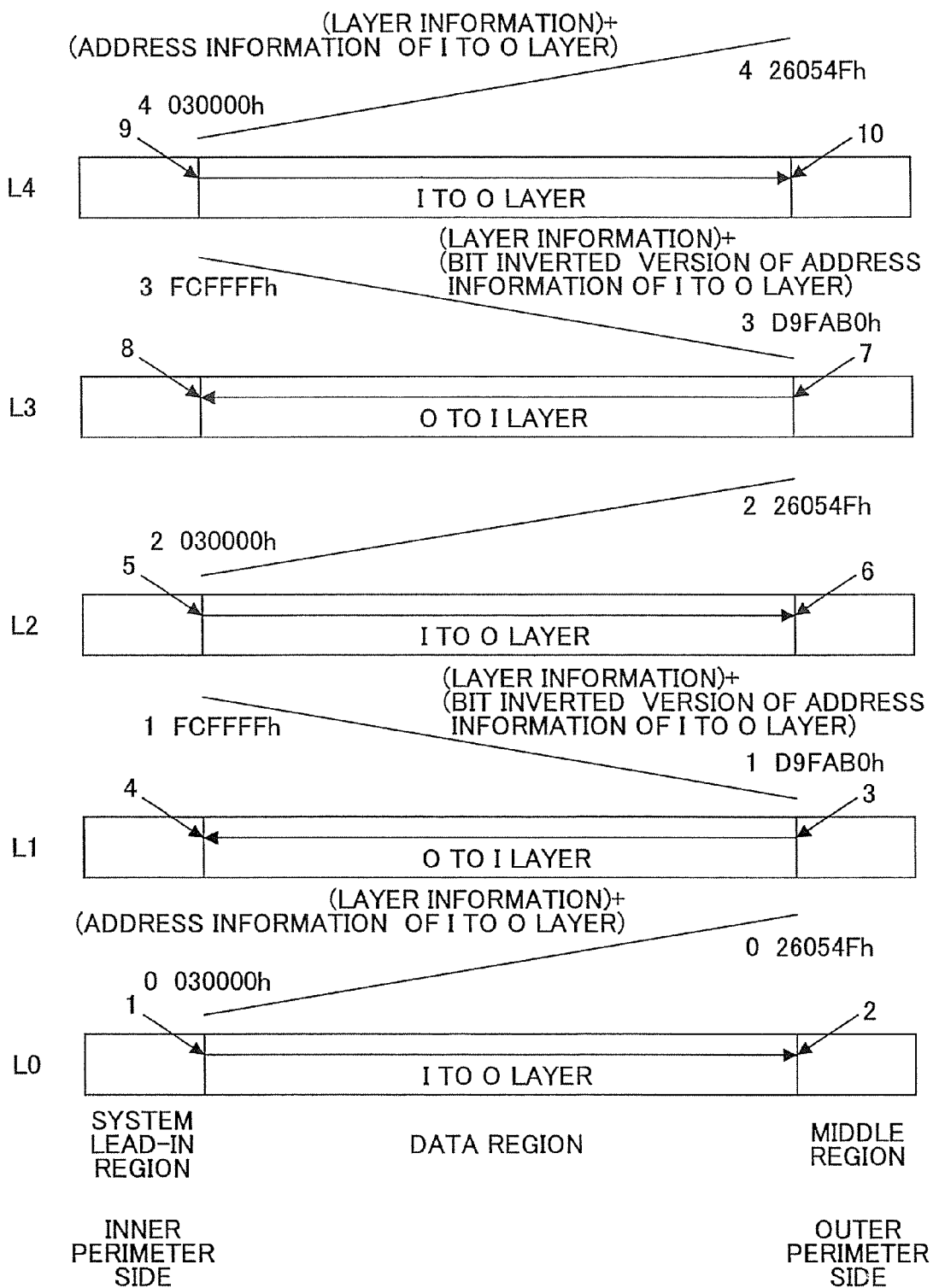
FIG. 5 illustrates a method of assigning layer information and address information.

The address information, the data region, the system lead-in region, and the middle region are the same as those described in the first embodiment with reference to FIG. 5.

In the present embodiment, layer information and group information for identifying each layer are added to the address information. For example, the layer information is added to a higher-order bit, and the group information is added to an even higher-order bit.

In the case of the L0 layer, "0" denoting L0 is added as layer information to a higher-order bit of the address information "030000h" of the innermost perimeter 1 in the data region, so that this address is changed to "0 030000h". Similarly, the outermost perimeter 2 is changed to "0 26054Fh". In this embodiment, the layer information and the address information are both bit-inverted to obtain the layer information and address information of L1. That is, the layer information and the address information of L0, which is an I to O layer, is bit-inverted to obtain the layer information and the address information of L1, which is an O to I layer. Accordingly, the outermost perimeter 3 of the L1 layer becomes "F D9FAB0h", which is obtained by bit-inverting "0 26054Fh", and the innermost perimeter 4 of the L1 layer becomes "F FCFFFFh", which is obtained by bit-inverting "0 030000h". If it is recognized that the higher-order bit expressing the layer information is "F", this layer will be identified as being L1. However, if this layer information is bit-inverted once again in order to express L2, the value becomes "0" once again. Therefore, in the present embodiment, L0 and L1 are assumed to be one group, and a group number is assigned to this group. The group number is added as an even higher-order bit than the layer information.

That is, if the information of the position of the innermost perimeter of L0 (group information, layer information, and address information) is "0 0 030000h", the information of the position of the innermost perimeter of L1 is "0 F FCFFFFh", which is the bit-inverted version of the layer information and the address information of L0. Furthermore, by bit-inverting the layer information and the address information of the innermost perimeter of L1, and by changing the group number, "1 0 030000h" is obtained, which can be recognized as being information of L2. Thereafter, the information of L3 is "1 F FCFFFFh", and the information of L4 is "2 0 030000h".

Accordingly, it is possible to manage access to the information layers and the timing of sending out recording data with a simple conversion process and by using the same circuit and calculation algorithm.

Furthermore, as a matter of simplification, the group number and the layer information are described as being added to higher-order bits of the address information. However, in the layer information of an actual medium such as a ROM medium in which information is inserted by bits, there are frames provided at the front half of the data region for describing address information. Among these frames, there is a frame for describing layer information. Therefore, there may be a case where the layer information is described in a frame different from that of the address information. Furthermore, the group number can be stored in the same frame as that storing the layer information. If there is no spare space in the frame storing the layer information, a new frame can be created for storing the group number using a spare frame such as a reserve frame. The present invention includes such an embodiment.

Furthermore, for example, the bit-inverted version of the layer information and the address information of the O to I layer L1 can be used as the layer information and the address information of the I to O layer L2 shown in FIG. 6. In this case, if the starting point of L0 and the ending point of L1 are at different positions, the starting point of L2 will have a different starting address number from that of the starting point of L0. Nevertheless, the I to O layers have substantially the same address information for common radial positions, which means that the I to O layers have substantially the same address information. The same applies to O to I layers.

In the above example, the information of the innermost perimeter of L1 is "0 F FCFFFFh", which is obtained by bit-inverting the layer information and the address information included in the information "0 0 030000h" of the position of the innermost perimeter of L0. However, due to the impact of deflection and the impact on the laser intensity caused when the laser optical path traverses the system lead-in region, there are cases where the data region ends slightly toward the outer perimeter. For example, the information of the position of the innermost perimeter of L1 may not end at "0 F FCFFFFh", which is the bit-inverted version of the layer information and the address information in "0 0 030000h" corresponding to the starting address of L0. Instead, the information of the position of the innermost perimeter of L1 may end at "0 F FCFFFDh". In this case, the information of the starting point of L2 is "1 0 030002h", which is obtained by bit-inverting the layer information and the address information of L1. As described above, all of the I to O layers have substantially the same address information and all of the O to I layers have substantially the same address information, but there may be slight differences. However, common radial positions have substantially the same addresses. Therefore, even if media have various numbers of information layers, by performing predetermined conversion on the address information of a certain information layer, the address information of another information layer can be easily acquired.

Furthermore, the layer information and the address information of the outermost perimeter 3 of L1 do not need to be a completely bit-inverted version of the layer information and the address information of the outermost perimeter 2 of L0, but can be substantially the same value as the bit-inverted value.

Furthermore, as shown in FIG. 7 (sixth embodiment), the even number layers in each group (L0, L2, L4 . . . ) can be given the same layer information and address information for I to O. The layer information and address information of the odd number layers (L1, L3, L5 . . . ) can be obtained by bit-inverting the layer information and address information of adjacent even number layers. With such a method, all of the I to O layers can have the same layer information and address information except for group numbers, and likewise, all of the O to I layers can have the same layer information and address information except for group numbers. Moreover, the address information of another information layer can be easily acquired.

The same effects as the above can be achieved by performing sign inversion instead of bit inversion.

The physical address number PSN (Physical Sector Number) of L1 in the optical disc 101 having an OTP format is obtained by performing a predetermined conversion method (e.g., bit inversion) on the PSN of L0 corresponding to the same radial position. That is, at the position corresponding to PSN: 030000h of L0, the PSN of L1 is FCFFFFh. When bit 23 is expressed as a sign bit by indicating a negative number with a complement of two, "−030000h" is expressed as "FD0000h", and therefore the difference is only one. Accordingly, bit inversion substantially corresponds to sign inversion by using a complement of two for the expression. Thus, as described for bit inversion, by the method of assuming that L0 and L1 are one group, assigning a group number to this group, and adding this group number as an even higher-order bit than the layer information, it is possible to distinguish addresses of plural layers L2 and beyond.

Seventh Embodiment

As shown in FIGS. 8A and 8B (FIG. 8A is a cross-sectional view and FIG. 8B is a plan view), for example, in L0, guide grooves 106 are carved in a helical manner from the inner perimeter toward the outer perimeter of the disc. An optical head tracks the part in the guide grooves 106 or between these guide grooves 106 to record/reproduce information. The parts in between the guide grooves 106 are referred to as lands 105.

These guide grooves 106 have predetermined helical intervals (track intervals 104), and the guide grooves 106 meander by a microscopic amount in a sinusoidal manner in the radial direction of the optical disc 101. These meandering shapes are referred to as "Wobbles". The amount to which the guide grooves 106 wobble (wobbling amount) needs to be sufficiently smaller than the track intervals 104 so as not to interfere with the track tracking operation of the optical head, or with the recording data. For example, the wobbling amount is preferably approximately 5% of each track interval 104. That is, if the track interval 104 is 0.74 μm, the meandering amount will be approximately 0.03 μm.

A frequency 107 of the wobbles in the track direction is preferably short in terms of enhancing detection resolution. However, if the recording data signals and the spectrum interfere with each other, the detection may not be possible. For this reason, the frequency 107 cannot be made too short. The frequency 107 is to be, for example, approximately 5 μm.

The wobbles are configured to have a constant spatial frequency on average. Therefore, by rotating a rotational motor of an optical information recording/reproducing apparatus in accordance with this frequency, it is possible to perform CLV (constant linear velocity) control. Furthermore, clock signals can be generated in synchronization with the wobbles so as to be used as a recording data clock.

The wobbles of the guide grooves are appropriately modulated. By this modulation, it is possible to embed address information and other auxiliary information. Accordingly, even before recording data in the disc, it is possible to search for an arbitrary position in the optical disc, so that data can be recorded in the arbitrary position.

FIG. 9 illustrates an example of wobble Modulation. In FIG. 9, the horizontal direction is the track direction (tangential direction), and the vertical direction is the radial direction. This is an example of phase modulation. Specifically, digital information can be embedded by assuming that a sinusoidal wave 111 of a zero-degree phase corresponds to "0", and by assuming that a sinusoidal wave 112 of a 180-degree phase corresponds to "1". Other than phase modulation, frequency modulation, or amplitude modulation can be performed as the modulation method.

This operation of embedding address information by wobble modulation of the guide grooves, or the embedded address information, is referred to as ADIP (ADdress In Pregroove) for DVDs.

FIG. 10 illustrates an example of the relationship between the ADIP and the PSN of recording data. Generally, ADIP needs to be created in such a manner as to not interfere with the recording data, and therefore the recording density cannot be high. Accordingly, the address is expressed by a single number representing several physical sectors with PSNs.

In the example shown in FIG. 10, a single ADIP address represents four sectors (PSN). Accordingly, ADIP can be expressed by a shorter word length than the address of recording data. In the example shown in FIG. 10, the ADIP has six digits; however, layer information can be added so that the ADIP has seven digits. For example, the ADIP of L0 starts with "000000h"; however, a layer number "0" can be added as a higher-order bit so that the ADIP is "0000000h". However, the layer information is omitted from this description on PSN. The value is obtained by dividing PSN by four.

As described with reference to FIG. 10, a single ADIP represents four PSNs, and is thus treated as follows. In the following, each of the ADIPs corresponds to "PSN/4". An ADIP "098153h" corresponds to a PSN "26054Fh" of the outermost perimeter of L0. An ADIP "367EACh" corresponds to a PSN "D9FAB0h" of the outermost perimeter of L1. An ADIP "3F3FFFh" corresponds to a PSN "FCFFFFh" of the innermost perimeter of L1. The ADIP "367EACh" corresponds to a PSN "D9FAB0h" of the outermost perimeter of L1; however, this value also corresponds to the bit-inverted version of the ADIP "098153h" of L0. Furthermore, assuming that the bit 21 of ADIP is a sign bit, and to express it with a complement of two, the value "367EACh" is obtained by subtracting one from "−098153h", which is a negative number of the ADIP of L0 "098153h". Therefore, the difference is only one. Accordingly, even if sign inversion were used to treat the ADIP, there would be no significant difference in terms of access operation.

As described above, in the case of OTP, the ADIP of L1 is obtained by bit-inverting (or by sign-inverting) the ADIP of the same radial position in L0. Furthermore, each of the ADIPs is two bits shorter than the word length of the recording data PSN, i.e., the relationship of "ADIP=PSN/4 (shifted to the right by two bits)" is satisfied. Accordingly, with regard to ADIP and PSN, it is easy to obtain one from the other by performing predetermined conversion, which is, in this case, dividing by four or multiplying by four.

Eighth Embodiment

Figure 11:
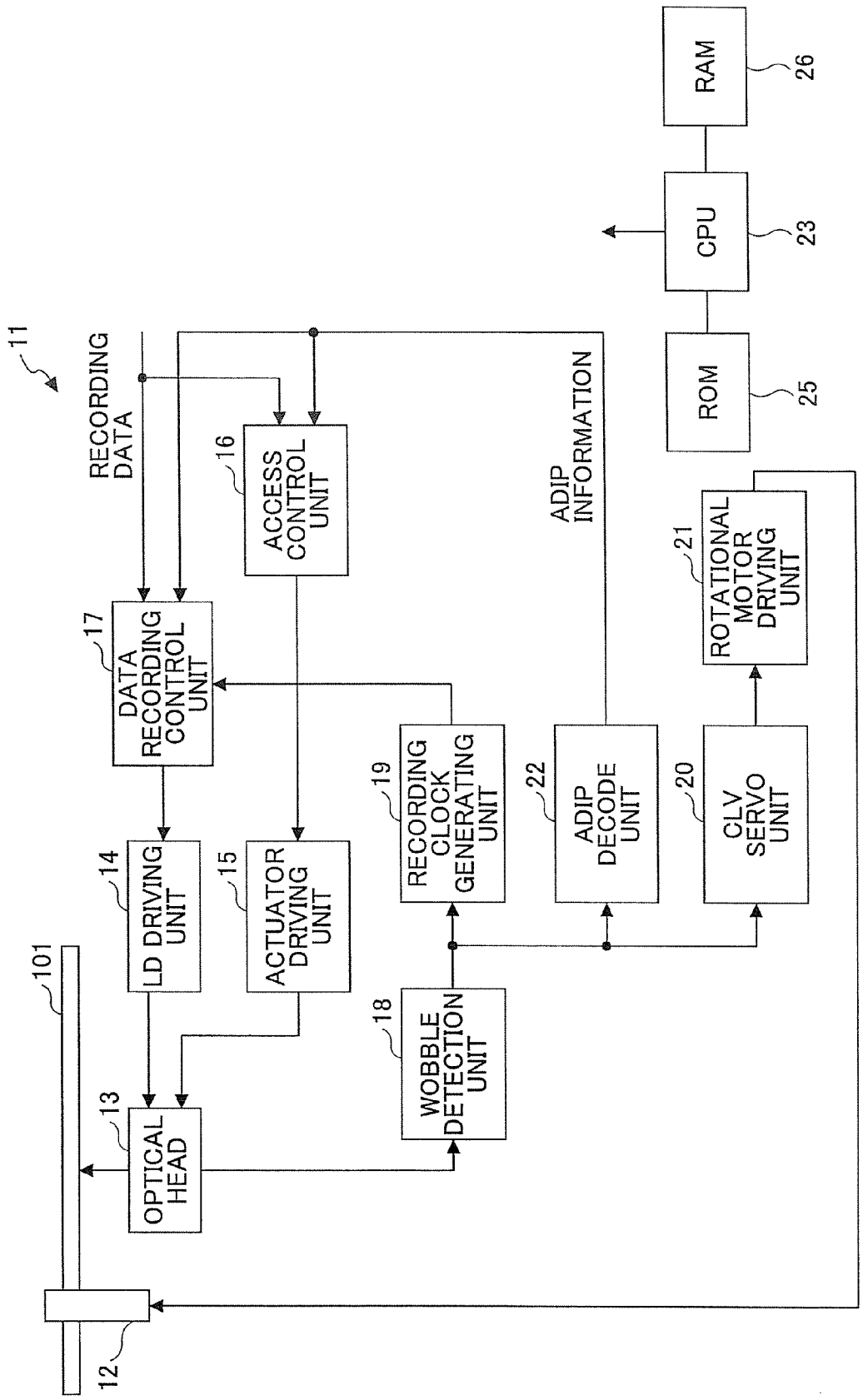
FIG. 11 is a schematic block diagram of an optical information recording/reproducing apparatus according to an embodiment of the present invention.

FIG. 11 illustrates an optical information recording/reproducing apparatus for recording or reproducing information for the optical disc according to the first embodiment. FIG. 11 is a schematic block diagram of an optical information recording/reproducing apparatus 11 according to an embodiment of the present invention. The optical disc 101 can be exchanged by a not shown loading mechanism. A rotational motor 12 is for rotating the optical disc 101.

An optical head 13 includes a laser diode (LD) that is a laser light source used for recording and reproducing, an optical system such as objective lenses for creating an optical spot by focusing a laser light beam onto an optical disc and for detecting the light reflected from the optical disc, a light receiving element for converting the reflected light into electric signals with a photoelectric transducer that is divided into plural segments, a lens actuator for moving the objective lenses in the focal direction and the radial direction to track the focal points and the guide grooves in each of the recording layers of the optical disc, and a head actuator for moving the entire optical head 13 in a radial direction of the optical disc (none of these are shown in the figure). These are known configurations, and therefore detailed descriptions are omitted.

An LD driving unit 14 performs data recording by modulating the above-described LD mounted in the optical head 13 according to recording data.

An actuator driving unit 15 drives the lens actuator and the head actuator, in such a manner as to perform a focal point/guide groove tracking servo operation with the use of a known (not shown) focal point tracking/guide groove tracking unit.

Moreover, in response to a command from an access control unit 16, the actuator driving unit 15 drives the lens actuator and the head actuator in such a manner as to move the light spot of the optical head 13 to a target position at which the recording data are to be written (radial position and recording layer in optical disc).

A data recording control unit 17 compares a target address for writing in the recording data to be recorded and a corresponding position of the optical disc. If they match, the data recording control unit 17 sends the recording data to the LD driving unit 14 (detailed operations are described below).

A wobble detection unit 18 detects meandering components of the guide grooves of the optical disc based on signals from the light receiving element in the optical head 13. Specifically, at least two light receiving elements, which are divided along the guide groove 106, respectively detect a primary diffraction light of the light reflected from the light spot. The difference signal between the two light receiving elements is referred to as a Push-Pull signal. This Push-Pull signal represents the wobble component.

A recording clock generating unit 19 generates clock signals that are phase-locked with wobble signals. Generally, this is a PLL circuit for generating a multiplication clock of wobble signals. Recording data are supplied to the LD driving unit 14 based on these clock signals, so that recording data are written in precise positions on the optical disc.

A CLV (constant linear velocity) servo unit 20 drives the rotational motor 12 with a rotational motor driving unit 21 according to results obtained by comparing the phases of the wobble signal and a standard signal (not shown). The wobbles of the guide grove are formed into the optical disc 101 at a constant spatial frequency. Therefore, CLV control can be realized as the rotational motor 12 rotates precisely in synchronization with the wobble signals.

An ADIP decode unit 22 demodulates the modulation component of the wobble signal to generate ADIP information. The detected ADIP information is output, as the current address information in the optical disc 101, to the data recording control unit 17 and the access control unit 16.

The access control unit 16 compares the target address indicated by the recording data and the current address in the optical disc 101 detected by the ADIP decode unit 22, and sends a moving command to the actuator driving unit 15 so that the light spot on which the optical head 13 focuses moves near the target address.

A CPU 23 intensively controls the entire optical information recording/reproducing apparatus 11 based on a control program stored in a ROM 24, by using a RAM 25 as the operation area.

Ninth Embodiment

The operations of the optical information recording/reproducing apparatus 11 of the eighth embodiment are described with reference to FIG. 12.

Figure 12:
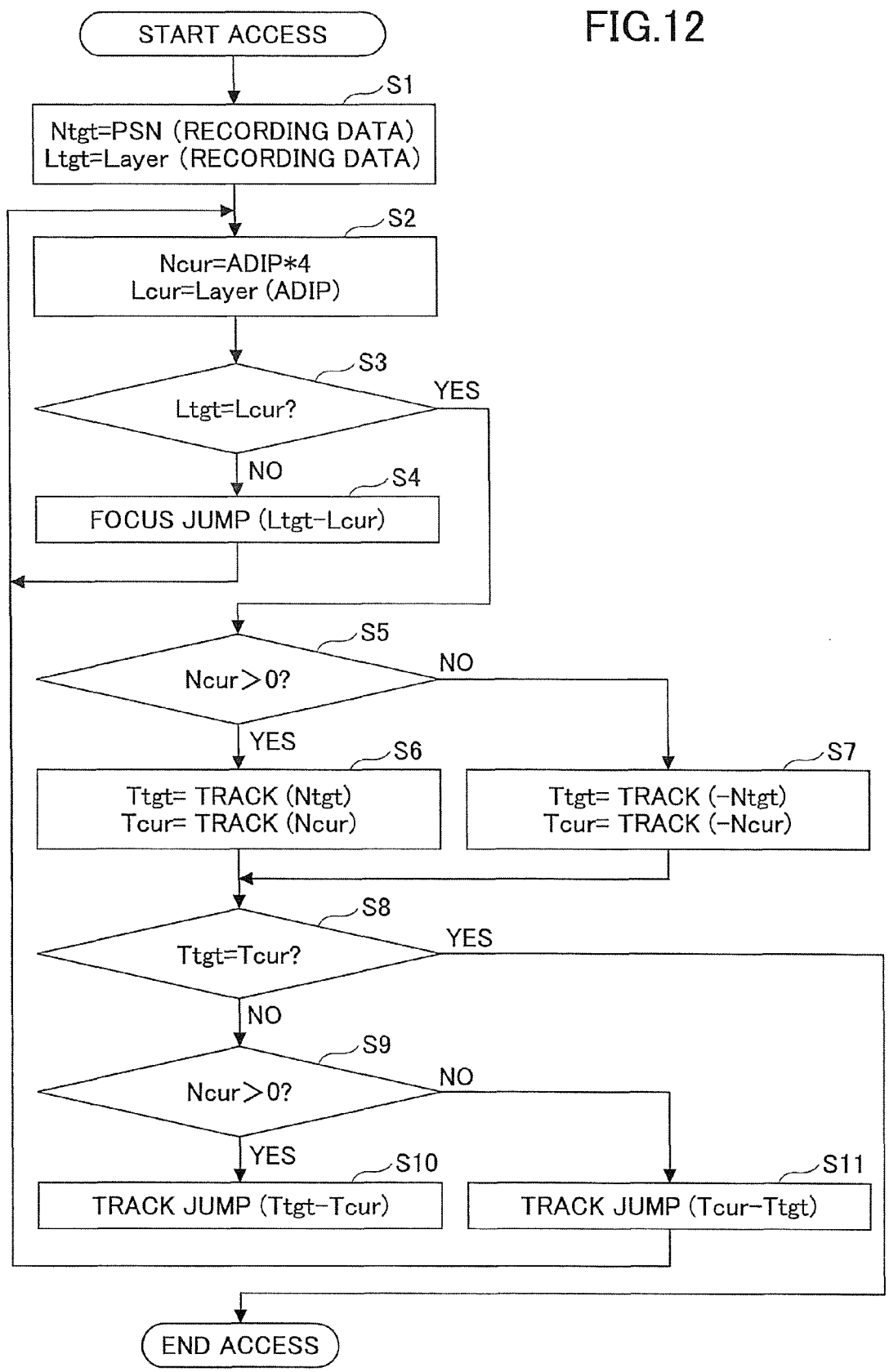
FIG. 12 is a flowchart of an operation of accessing the optical disc performed by an access control unit based on control by a CPU.

FIG. 12 is a flowchart for describing the operation of accessing the optical disc performed by the access control unit 16 based on control of the CPU 23. The process shown in FIG. 12 realizes an access unit and an access step.

First, the CPU 23 extracts, as Ntgt, a target address (PSN) of a position in the optical disc at which the recording data are to be written [hereinafter, the suffix "tgt" means target]. Furthermore, the CPU 23 extracts, as Ltgt, a recording layer in the optical disc, which layer is the target for writing recording data (step S1). The target address and the target recording layer can be supplied by an instruction from a higher-level device (an information processing apparatus 51 described below), separately from the recording data. Alternatively, the target address and the target recording layer can be embedded in the recording data sequence itself.

Next, according to an instruction from the CPU 23, the access control unit 16 extracts, from the ADIP data received from the ADIP decode unit 22, the current address Ncur and the current recording layer Lcur captured by the optical head 13 (step S2) [hereinafter, the suffix "cur" means current].

That is, the CPU 23 detects, with the use of the wobble detection unit 18, meandering components of the guide groove 106 of the optical disc, from signals of the light receiving elements of the optical head 13 (reading unit, reading step). Then, the ADIP data are demodulated in these meandering components, which ADIP data have been modulated by phase modulation, frequency modulation, or amplitude modulation (address information acquiring unit, address information acquiring step).

In this case, Ncur is obtained by multiplying the address indicated by the ADIP data by four. As described above, the ADIP address corresponds to "PSN/4". Therefore, for the purpose of comparing it with the target PSN, the ADIP address is multiplied by four so as to be in the same units as the target PSN.

The current recording layer Lcur is identified by reading information that specifies the layer of the ADIP address. The access control unit 16 determines whether the target recording layer Ltgt and the current recording layer Lcur are the same (step S3). If they are the same (Yes in step S3), the process control proceeds to step S5. If they are not the same (No in step S3), the process control proceeds to step S4.

In step S4, the difference between Ltgt and Lcur is obtained. According to the obtained value, the direction of jumping and the number of jumps among the recording layers are determined, and a jumping operation (focus jump) among the recording layers is performed (step S4). For example, if the value of the difference between Ltgt and Lcur is positive, it is determined that the focal point at Lcur is to jump in the direction so that the Layer number increases (in the optical disc 101 of FIG. 1, the focal point at Lcur is to jump toward a recording layer in a higher direction). For example, if Ltgt is 1 and Lcur is 0, "Ltgt−Lcur=1" is satisfied, which means that the focal point at Lcur jumps in a higher direction by an amount corresponding to one recording layer. If "Ltgt=0, Lcur=1", then "Ltgt−Lcur=−1" is satisfied, which means that the focal point at Lcur jumps in a lower direction by an amount corresponding to one recording layer.

Specifically, the focus jump among recording layers is performed by driving the objective lens of the optical head 13 up and down to move the focal point to another recording layer. This is a known technology and therefore detailed descriptions are omitted. After such focus jump is performed, the steps from step S2 onward are performed again. In this manner, focus jump is repeated until the current recording layer Lcur matches the target recording layer Ltgt. After exiting the loop of the focus jump operation, the process control proceeds to step S5.

In step S5, the access control unit 16 determines whether the current address Ncur is an even number or an odd number. In a case where the optical disc is an OTP disc, if the ADIP address is an odd number, then the ADIP address is in a recording layer in a reverse helix. If the ADIP address is an even number (including L0), then the ADIP address is in a recording layer in a positive helix.

In steps S6 and S7, the access control unit 16 performs a calculation for converting the address into a track number T. The track number corresponds to the number of guide grooves 106. It is assumed that the track is "0" at the position of "PSN: 030000h", and the track number is incremented by one for each rotation. In a disc having a constant linear density such as the CLV format, the number of tracks T in an arbitrary PSN can be calculated from a track pitch Tp and a length "a" of one sector. For example, the following formula (1) can be used for the calculation.

$$T=\text{sqrt}[(PSN-030000h) \times a \times Tp/pi + r0^2]/Tp - r0/Tp \quad (1)$$

[in the formula, a: physical sector length, r0: the radius of the optical disc 101 when the PSN is at "30000h", sqrt[ ]: the square root, and pi: the circular constant]

In step S6, the current address is in a positive helix. Therefore, the formula (1) is used as it is to calculate the track numbers of the position of the target address Ntgt and the position of the current address Ncur. The track number of the position of Ntgt is referred to as Ttgt, and the track number of the position of Ncur is referred to as Tcur.

In step S7, the current address is in a reverse helix. Therefore, by sign-inverting (or bit-inverting) the current address (conversion unit, conversion step), the calculation can be performed in the same manner as in the positive helix. Accordingly, the track number of the current address can be calculated as –Ncur by using formula (1). With respect to the target address, the recording data target position instruction is preferably expressed in the same format. Similar to the current address, the target address is sign-inverted (or bit-inverted) to obtain the track number.

In step S8, the access control unit 16 compares the target track number Ttgt and the current track number Tcur. If these are the same (Yes in step S8), then the current position is included along the track circumference of the target sector, and therefore it is not necessary to move the current address in the radial direction of the optical disc. It is only necessary to track the current track and wait for the target address to come to the current address, and therefore the sequence of the access operation ends.

If the target track number Ttgt and the current track number Tcur are not the same (No in step S8), the access control unit 16 once again determines whether the current address Ncur is positive (step S9). If the current address Ncur is positive (Yes in step S9), the current address Ncur is in a positive helix, and therefore the process control proceeds to step S10. If the current address Ncur is negative (No in step S9), the current address Ncur is in a reverse helix, and therefore the process control proceeds to step S11.

In steps S10 and S11, the current address moves in the radial direction of the optical disc 101 by the number of tracks corresponding to the difference in the track numbers "Ttgt–Tcur". This is referred to as track jump. The positive direction of jumping is, for example, in a direction toward the outer perimeter of the optical disc.

Step S10 is performed in a case of a positive helix, and therefore the current position is to track jump by an amount corresponding to "Ttgt–Tcur" toward the outer perimeter of the optical disc 101 if Ttgt is greater than Tcur. If "Ttgt>Tcur" is satisfied, the result of "Ttgt–Tcur" is positive, and therefore the current position is to jump toward the outer perimeter.

Step S11 is performed in a case of a reverse helix, and therefore the current position is to track jump by an amount corresponding to "Tcur–Ttgt" toward the inner perimeter of the optical disc 101 if Ttgt is greater than Tcur. If "Ttgt>Tcur" is satisfied, the result of "Tcur–Ttgt" is positive, and therefore the current position is to jump toward the inner perimeter.

After performing the above track jump (steps S10, S11), the process control returns to step S2 and the current address is confirmed. This is because there may be errors in the distance jumped, and by jumping repeatedly, the distance may become asymptotic. By the time the access loop ends, the current position is within one cycle before the target sector.

Figure 13:
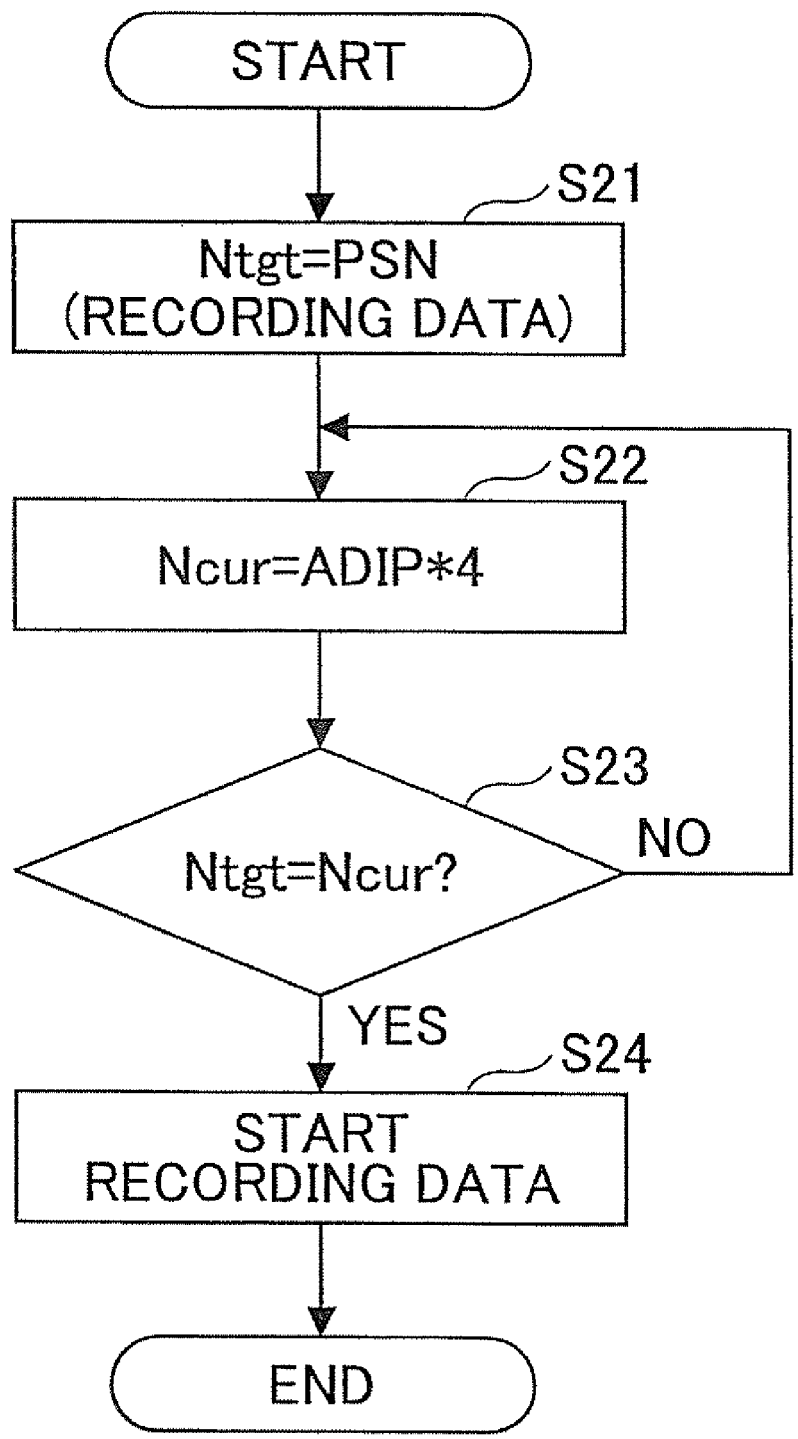
FIG. 13 is a flowchart of a recording operation performed by a data recording control unit based on control by the CPU.

FIG. 13 is a flowchart of a recording operation performed by the data recording control unit 17 based on control of the CPU 23. The process shown in FIG. 13 realizes a recording unit and a recording step. This process starts from the point where the access control unit 16 ends the access operation shown in FIG. 12. First, the CPU 23 extracts, as Ntgt, a target address (PSN) of a position in the optical disc at which the recording data are to be recorded (step S21). The target address and the target recording layer can be supplied by an instruction from a higher-level device (an information processing apparatus 51 described below), separately from the recording data. Alternatively, the target address and the target recording layer can be embedded in the recording data sequence itself.

Next, the data recording control unit 17 extracts, from the ADIP data received from the ADIP decode unit 22, the current address Ncur captured by the optical head 13 (step S22). In this case also, Ncur is obtained by multiplying the ADIP address by four. As described above, the ADIP address corresponds to "PSN/4". Therefore, for the purpose of comparing it with the target PSN, the ADIP address is multiplied by four so as to be in the same units as the target PSN.

The data recording control unit 17 determines whether the current address Ncur and the target address Ntgt are the same (step S23). If they are the same (Yes in step S23), the process control proceeds to step S24. If they are not the same (No in step S23), the process control returns to step S22, and the next ADIP address is detected. The processes in this loop are repeated until the current address Ncur matches the target address Ntgt.

Finally, when the current address Ncur matches the target address Ntgt (Yes in step S23), the data recording control unit 17 starts sending out the recording data, and the LD driving unit 14 and the optical head 13 start recording the recording data into the optical disc (step S24).

Figure 14:
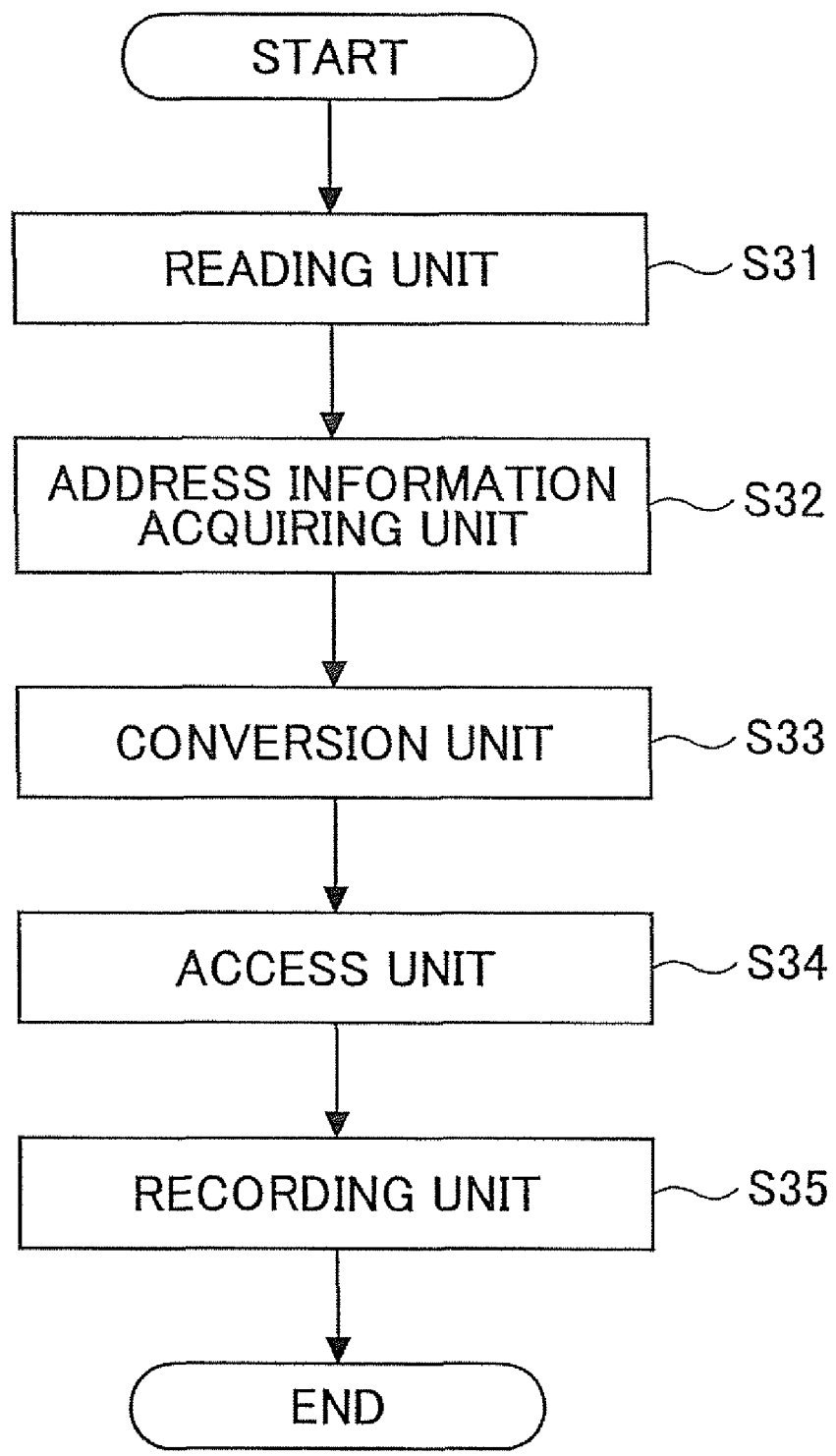
FIG. 14 is a flowchart of an overview of an optical information recording method performed by an optical information recording/reproducing apparatus.

Details of the optical information recording method performed by the optical information recording/reproducing apparatus 11 are described above with reference to FIGS. 12 and 13. An overview of this method is organized and described with reference to the flowchart of FIG. 14.

First, the CPU 23 uses the wobble detection unit 18 to detect meandering components of the guide grooves 106 of the optical disc 101 from signals received from the light emitting elements of the optical head 13 (reading unit=step S31). The ADIP data that have been modulated by phase modulation are demodulated in the meandering components (address information acquiring unit=step S32). Then, the ADIP data in L1 can be acquired by performing predetermined simple conversion such as bit-inversion or sign-inversion on the ADIP data in L0 of the same position in the radial direction of the optical disc 101 (conversion unit=step S33).

With the use of the ADIP data acquired in this manner, the processes shown in FIG. 12 are performed for the optical head 13 to access a predetermined position in one of the recording layers of the optical disc 101 (access unit=step S34). Then, with the processes shown in FIG. 13, the recording data are recorded into the recording layer of the accessed position (recording unit=step S35).

Tenth Embodiment

Figure 15:
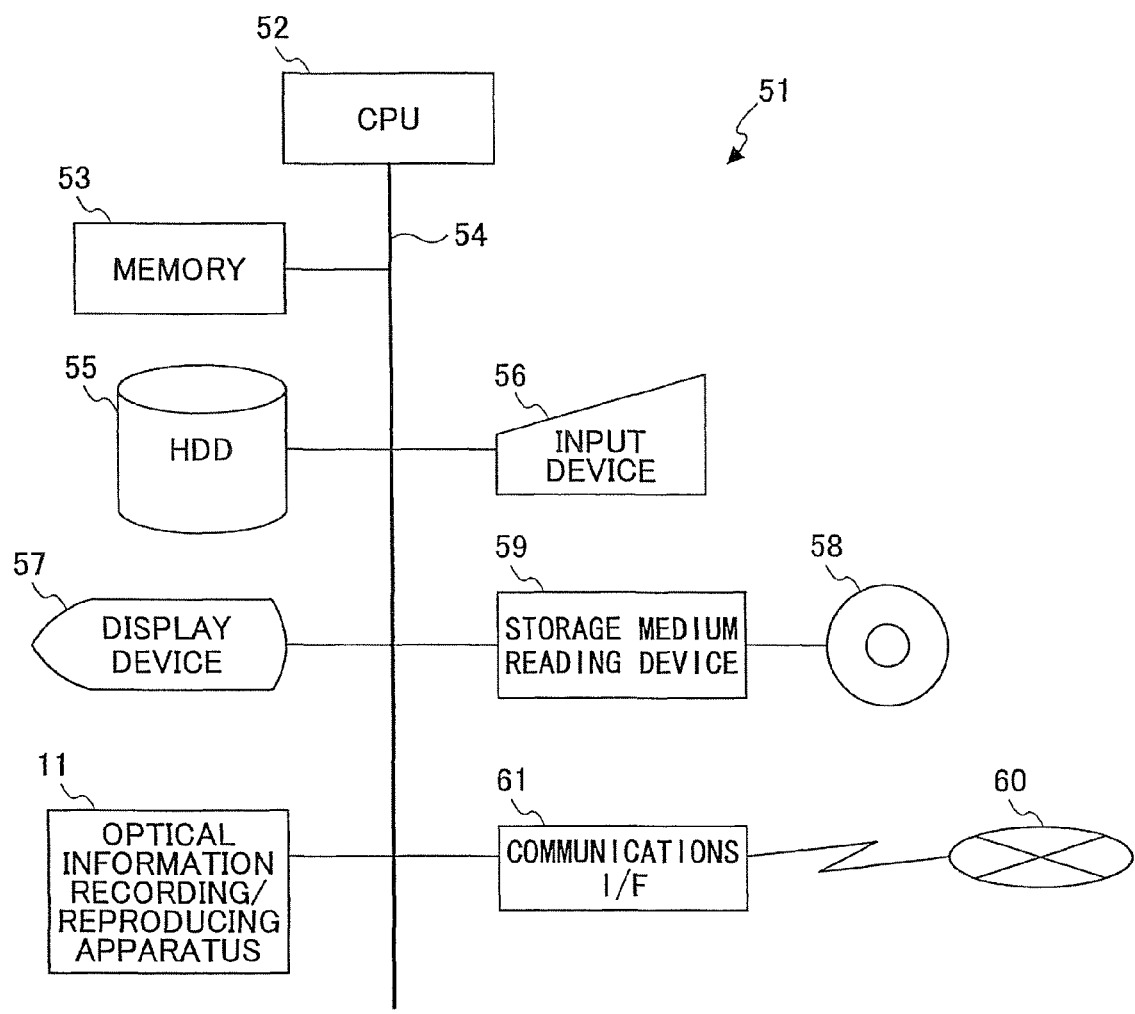
FIG. 15 is a block diagram of the electric connections of an information processing apparatus according to an embodiment of the present invention.

FIG. 15 is a block diagram of the electric connections of the information processing apparatus 51 according to an embodiment of the present invention. The information processing apparatus 51 is configured with a computer such as a personal computer, and includes a CPU 52 for performing various calculations and centrally controlling the units in the apparatus, and a memory 53 configured with various ROMs and RAMs, which are connected by a bus 54.

A magnetic storage device 55 such as a hard disk, an input device 56 such as a mouse and a keyboard, a display device 57 such as an LCD or a CRT, a storage medium reading device 59 for reading a storage medium 58 such as an optical disc, and the optical information recording/reproducing apparatus 11 are connected to the bus 54 via predetermined interfaces. Furthermore, a predetermined communications interface 61 is also connected to the bus 54 for performing communications with a network 60. The communications interface 61 can be in communication with a WAN such as the Internet via the network 60. The storage medium 58 can be, for example an optical disc such a CD or a DVD, a magnetic optical disc, and a flexible disk. According to the type of storage medium 58, the storage medium reading device 59 can specifically be, for example, an optical disc drive, a magnetic optical disc drive, and a flexible disk drive. The storage medium reading device 59 and the optical information recording/reproducing apparatus 11 are shown separately, but the storage medium reading device 59 and the optical information recording/reproducing apparatus 11 can be a single device.

Furthermore, in the above description of the optical information recording/reproducing apparatus 11, it is assumed that the processes of FIGS. 12 and 13 are performed according to the control of the CPU 23; however, the processes of FIGS. 12 and 13 can be realized by control executed by the information processing apparatus 51 according to a control program stored in the magnetic storage device 55.

In this case, the control program stored in the magnetic storage device 55 configures the program product according to an embodiment of the present invention. This control program is read by the storage medium reading device 59 from the storage medium 58 configuring the storage medium according to an embodiment of the present invention. Alternatively, this control program can be downloaded from a WAN such as the Internet and installed into the magnetic storage device 55. By being installed in the magnetic storage device 55, the information processing apparatus 51 can be operated according to the above-described control. This control program can be operated on a predetermined OS. Furthermore, this control program can be part of specific application software.

The following are provided according to embodiments of the present invention.

1) A multilayer optical information medium includes three or more information layers, wherein address information indicating positions in each of the information layers is recorded in a helical manner; the information layers include at least one I to O layer in which values representing addresses in the address information increase from an inner perimeter section toward an outer perimeter section, and at least one O to I layer in which the values representing the addresses in the address information increase from the outer perimeter section toward the inner perimeter section; all of the I to O layers have substantially the same address information and all of the O to I layers have substantially the same address information; and layer specifying information specifying the information layer is attached to the address information.

2) In the multilayer optical information medium described in 1), each of the information layers includes a recording layer in which recording data can be written; and guide grooves provided in a helical manner, which guide grooves form wobbles in a radial direction, wherein the address information is modulated and recorded in the wobbles of the guide grooves.

3) In the multilayer optical information medium described in 1) or 2), the I to O layer and the O to I layer are laminated alternately.

4) In the multilayer optical information medium described in any one of 1) through 3), the address information of the O to I layer corresponds to a bit-inverted version of the address information of the I to O layer.

5) In the multilayer optical information medium described in any one of 1) through 3), the address information of the O to I layer or the address information of the I to O layer corresponds to a bit-inverted version of the address information of an adjacent information layer.

6) In the multilayer optical information medium described in any one of 1) through 3), the address information of the O to I layer is a sign-inverted version of the address information of the I to O layer.

7) In the multilayer optical information medium described in any one of 1) through 3), the address information of the O to I layer or the address information of the I to O layer corresponds to a sign-inverted version of the address information of an adjacent information layer.

8) In the multilayer optical information medium described in 1), the I to O layer and the O to I layer are laminated alternately; each of the information layers includes layer information and the address information; the layer information and the address information of the I to O layer and the layer information and the address information of the O to I layer are bit-inverted versions of each other; the I to O layer and the O to I layer adjacent to each other form a group, and a group number is assigned to the group; and the layer specifying information includes a combination of the group number and the layer information.

9) In the multilayer optical information medium described in 1), the I to O layer and the O to I layer are laminated alternately; each of the information layers includes layer information and the address information; the layer information and the address information of the I to O layer and the layer information and the address information of the O to I layer are sign-inverted versions of each other; the I to O layer and the O to I layer adjacent to each other form a group, and a group, number is assigned to the group; and the layer specifying information includes a combination of the group number and the layer information.

10) In the multilayer optical information medium described in 8) or 9), each of the information layers includes a recording layer in which recording data can be written; and guide grooves provided in a helical manner, which guide grooves form wobbles in a radial direction, wherein the address information is modulated and recorded in the wobbles of the guide grooves.

11) In the multilayer optical information medium described in any one of 1) through 10), predetermined conversion is performed on a data address of recording data so that the address information is expressed by a shorter word length than that of the data address.

12) In the multilayer optical information medium described in any one of 2) through 7), the address information is modulated by phase modulation.

13) In the multilayer optical information medium described in any one of 2) through 7), the address information is modulated by frequency modulation.

14) In the multilayer optical information medium described in any one of 2) through 7), the address information is modulated by amplitude modulation.

15) An optical information processing apparatus for the multilayer optical information medium described in any one of 1) through 14) includes an address reading unit configured to read the address information indicating the positions recorded in a helical manner in each of the information layers of the multilayer optical information medium including three or more information layers; an acquiring unit configured to acquire the layer specifying information of each of the information layers; an access unit configured to access the information layer by using the address information and the layer specifying information; and at least one of a data reading unit configured to read data recorded at an accessed position accessed by the access unit and a writing unit configured to write data into the accessed position.

16) A program product includes instructions for causing the optical information processing apparatus described in 15) to perform an address reading step of reading the address information indicating the positions recorded in a helical manner in each of the information layers of the multilayer optical information medium including three or more information layers; an acquiring step of acquiring the layer specifying information of each of the information layers; an access step of accessing the information layer by using the address information and the layer specifying information; and at least one of a data reading step of reading data recorded at an accessed position accessed at the access step and a writing step of writing data into the accessed position.

17) An information medium stores the program product described in 16).

According to one embodiment of the present invention, a multilayer optical information medium includes three or more information layers, wherein address information indicating positions in each of the information layers is recorded in a helical manner, the information layers include at least one I to O layer in which values representing addresses in the address information increase from an inner perimeter section toward an outer perimeter section, and at least one O to I layer in which the values representing the addresses in the address information increase from the outer perimeter section toward the inner perimeter section, all of the I to O layers have substantially the same address information and all of the O to I layers have substantially the same address information, and layer specifying information specifying the information layer is attached to the address information.

Thus, it is possible to access an arbitrary position in a multilayer optical information medium, where address information does not interfere with the recording data, even if the multilayer optical information medium includes three or more information layers (for example, ROM, R, RW). Accordingly, even if media have various numbers of information layers, by performing predetermined conversion on the address information of a certain information layer, the address information of another information layer can be easily acquired.

All of the I to O layers have substantially the same address information and all of the O to I layers have substantially the same address information. They are "substantially" the same, because they are not always completely the same. For example, the address information at the innermost perimeter section can be somewhat different due to the impact of deflection and the impact on the laser intensity caused when the laser optical path traverses the system lead-in region. The present invention includes cases where the address information is not completely the same. However, it is obvious that the difference is limited within a range so that the function as the address information is not lost. All of the I to O layers have substantially the same address information and all of the O to I layers have substantially the same address information. Therefore, the I to O layers have substantially the same address information for common radial positions, and the same applies to the O to I layers. Accordingly, even if media have various numbers of information layers, by performing predetermined conversion on the address information of a certain information layer, the address information of another information layer can be easily acquired.

Furthermore, each of the information layers can include a recording layer in which recording data can be written, and guide grooves provided in a helical manner, which guide grooves form wobbles in a radial direction. The address information can be modulated and recorded in the wobbles of the guide grooves.

Accordingly, in a multilayer optical information medium in which recording data can be written, including three or more information layers (e.g., R, RW), even before recording data in the medium, it is possible to access an arbitrary position in the medium with the use of address information, and the address information does not interfere with the recording data. Accordingly, even if media have various numbers of information layers laminated on each other, i.e., even if media have various numbers of recording layers laminated on each other, by performing predetermined conversion on the address information of a certain recording layer, the address information of another recording layer can be easily acquired.

Furthermore, the address information (value indicating the address) can include information unique to each information layer [layer information (layer address: Data ID)] in an integral format. Alternatively, the address information and the layer information can be included in separate formats.

Furthermore, the I to O layer and the O to I layer are preferably laminated alternately. Accordingly, the focal point need not move a long distance in the radial direction of the optical information medium just to jump to another information layer (recording layer) during a sequential recording operation. As a result, it is possible to prevent a real-time video from being discontinued between information layers (recording layers).

Furthermore, the address information of the O to I layer preferably corresponds to a bit-inverted version or a sign-inverted version of the address information of the I to O layer. Furthermore, the address information of the O to I layer or the address information of the I to O layer preferably corresponds to a bit-inverted version or a sign-inverted version of the address information of an adjacent information layer. Accordingly, it is possible to manage access to the information layers and the timing of sending out recording data with a simple conversion process and by using the same circuit and calculation algorithm.

Furthermore, the multilayer optical information medium can be configured such that the I to O layer and the O to I layer are laminated alternately, each of the information layers includes layer information and the address information, the layer information and the address information of the I to O layer and the layer information and the address information of the O to I layer are bit-inverted versions or sign-inverted versions of each other, the I to O layer and the O to I layer adjacent to each other form a group, and a group number is assigned to the group, and the layer specifying information includes a combination of the group number and the layer information.

If the layer information is bit-inverted together with the address information, there is no problem in, for example, the conversion from L0 to L1. However, if the layer information were bit-inverted once again for the conversion from L1 to L2, the layer information would become the original value (i.e., that of L0). Specifically, the layer information "0" for the L0 layer is bit-inverted to "1" to obtain the layer information for L1. Accordingly, the L0 layer and the L1 layer are distinguishable. However, if the layer information of the L1 layer "1" were bit-inverted again, "0" would be obtained once again. Thus, with this method, it is not possible to manage addresses to distinguish three or more layers from each other.

The same applies to the case of sign-inverting the layer information together with the address information. For example, the layer information "+" for the L0 layer is sign-inverted to "−" to obtain the layer information for L1. However, if the layer information of the L1 layer "−" were sign-inverted again, "+" would be obtained once again. Thus, with this method, it is not possible to manage addresses to distinguish three or more layers from each other.

However, in an embodiment of the present invention, two layers, each of whose layer information corresponds to the bit-inverted or sign-inverted version of the other, for example, L0 (I to O layer) and L1 (O to I layer), are regarded as a group. A group number is assigned to each group. Accordingly, it is possible to manage addresses for a multilayer optical information medium having three or more layers.

When the multilayer optical information medium according to the above embodiment of the present invention is configured such that each of the information layers includes a recording layer in which recording data can be written, and guide grooves provided in a helical manner, which guide grooves form wobbles in a radial direction, the address information can be modulated and recorded in the wobbles of the guide grooves. The same effects as the above can be achieved.

Furthermore, predetermined conversion is preferably performed on a data address of recording data so that the address information is expressed by a shorter word length than that of the data address.

Accordingly, low-density address information can be embedded, so that the address information is prevented from interfering with the recording data.

Furthermore, phase modulation, frequency modulation, or amplitude modulation is preferably used to modulate the address information. Accordingly, it is possible to easily acquire address information by demodulating the phase modulated address information.

Furthermore, to write data in and/or read data from the multilayer optical information medium including three or more information layers according to an embodiment of the present invention, an optical information processing apparatus is used. The optical information processing apparatus includes an address reading unit configured to read the address information indicating the positions recorded in a helical manner in each of the information layers of the multilayer optical information medium including three or more information layers, an acquiring unit configured to acquire the layer specifying information of each of the information layers, an access unit configured to access the information layer by using the address information and the layer specifying information, and at least one of a data reading unit configured to read data recorded at an accessed position accessed by the access unit and a writing unit configured to write data into the accessed position.

Furthermore, to write data in and/or read data from the multilayer optical information medium including three or more information layers according to an embodiment of the present invention, a program product is provided for causing the optical information processing apparatus to perform an address reading step of reading the address information indicating the positions recorded in a helical manner in each of the information layers of the multilayer optical information medium including three or more information layers, an acquiring step of acquiring the layer specifying information of each of the information layers, an access step of accessing the information layer by using the address information and the layer specifying information, and at least one of a data reading step of reading data recorded at an accessed position accessed at the access step and a writing step of writing data into the accessed position.

By using the above optical information processing apparatus and program product, even before recording data in the medium, it is possible to access an arbitrary position in the medium, and the address information will not interfere with the recording data.

Furthermore, by storing the program product in an information medium, the above process can be easily executed by the optical information processing apparatus.

The present invention is not limited to the specifically disclosed embodiment, and variations and expansions may be made without departing from the scope of the present invention.

The present application is based on Japanese Priority Patent Application No. 2007-057212, filed on Mar. 7, 2007, and Japanese Priority Patent Application No. 2007-273741, filed on Oct. 22, 2007, the entire contents of which are hereby incorporated by reference.

The invention claimed is:

1. A multilayer optical information medium comprising three or more information layers, wherein:
address information indicating positions in each of the information layers is recorded in a helical manner;
the information layers comprise at least one I to O layer in which values representing addresses in the address information increase from an inner perimeter section toward an outer perimeter section, and at least one O to I layer in which the values representing the addresses in the address information increase from the outer perimeter section toward the inner perimeter section;
the I to O layer and the O to I layer are laminated alternately, or a combination of two or more of the I to O layers laminated to each other and a combination of two or more of the O to I layers laminated to each other are laminated alternately;
all of the I to O layers have substantially the same address information and all of the O to I layers have substantially the same address information;
each of the information layers has layer information and the address information;
the layer information and the address information of the I to O layer and the layer information and the address information of the O to I layer are bit-inverted versions of each other;
a group is formed by one of the I to O layer and one of the O to I layer being laminated to each other, or a group is formed by one of the combinations of two or more of the I to O layers laminated to each other and one of the combinations of two or more of the O to I layers laminated to each other being laminated to each other, and a group number is assigned to the group; and
each of the information layers is identified by parameters including the group number, and wherein the group number is stored in a frame different from frames that store the layer information and the address information.

2. The multilayer optical information medium according to claim 1, wherein each of the information layers comprises: a recording layer in which recording data can be written; and guide grooves provided in a helical manner, which guide grooves form wobbles in a radial direction, wherein the address information is modulated and recorded in the wobbles of the guide grooves.

3. The multilayer optical information medium according to claim 1, wherein: the address information of the O to I layer corresponds to a bit-inverted version of the address information of the I to O layer.

4. The multilayer optical information medium according to claim 1, wherein: the address information of the O to I layer or the address information of the I to O layer corresponds to a bit-inverted version of the address information of an adjacent information layer.

5. The multilayer optical information medium according to claim 1, wherein: a predetermined conversion is performed on a data address of recording data so that the address information is expressed by a shorter word length than that of the data address.

6. The multilayer optical information medium according to claim 2, wherein: the address information is modulated by phase modulation.

7. The multilayer optical information medium according to claim 2, wherein: the address information is modulated by frequency modulation.

8. The multilayer optical information medium according to claim 2, wherein: the address information is modulated by amplitude modulation.

9. An optical information processing apparatus for the multilayer optical information medium according to claim 1, comprising: an address reading unit configured to read the address information indicating the positions recorded in a helical manner in each of the information layers of the multilayer optical information medium comprising three or more information layers; an acquiring unit configured to acquire layer specifying information of each of the information layers; an access unit configured to access the information layer by using the address information and the layer specifying information; and at least one of a data reading unit configured to read data recorded at an accessed position accessed by the access unit and a writing unit configured to write data into the accessed position.

10. A multilayer optical information medium comprising three or more information layers, wherein:
  address information indicating positions in each of the information layers is recorded in a helical manner;
  the information layers comprise at least one I to O layer in which values representing addresses in the address information increase from an inner perimeter section toward an outer perimeter section, and at least one O to I layer in which the values representing the addresses in the address information increase from the outer perimeter section toward the inner perimeter section;
  the I to O layer and the O to I layer are laminated alternately, or a combination of two or more of the I to O layers laminated to each other and a combination of two or more of the O to I layers laminated to each other are laminated alternately;
  all of the I to O layers have substantially the same address information and all of the O to I layers have substantially the same address information;
  each of the information layers has layer information and the address information;
  the layer information and the address information of the I to O layer and the layer information and the address information of the O to I layer are sign-inverted versions of each other;
  a group is formed by one of the I to O layer and one of the O to I layer being laminated to each other, or a group is formed by one of the combinations of two or more of the I to O layers laminated to each other and one of the combinations of two or more of the O to I layers laminated to each other being laminated to each other, and a group number is assigned to the group; and
  each of the information layers is identified by parameters including the group number, and wherein the group number is stored in a frame different from frames that store the layer information and the address information.

11. The multilayer optical information medium according to claim 10, wherein: the address information of the O to I layer is a sign-inverted version of the address information of the I to O layer.

12. The multilayer optical information medium according to claim 10, wherein: the address information of the O to I layer or the address information of the I to O layer corresponds to a sign-inverted version of the address information of an adjacent information layer.

13. The multilayer optical information medium according to claim 10, wherein each of the information layers comprises: a recording layer in which recording data can be written; and guide grooves provided in a helical manner, which guide grooves form wobbles in a radial direction, wherein the address information is modulated and recorded in the wobbles of the guide grooves.

14. A multilayer optical information medium comprising three or more information layers, wherein:
  address information indicating positions in each of the information layers is recorded in a helical manner;
  the information layers comprise at least one I to O layer in which values representing addresses in the address information increase from an inner perimeter section toward an outer perimeter section, and at least one O to I layer in which the values representing the addresses in the address information increase from the outer perimeter section toward the inner perimeter section;
  the I to O layer and the O to I layer are laminated alternately, or a combination of two or more of the I to O layers laminated to each other and a combination of two or more of the O to I layers laminated to each other are laminated alternately;
  all of the I to O layers have substantially the same address information and all of the O to I layers have substantially the same address information;
  each of the information layers has layer information and the address information;
  the layer information and the address information of the I to O layer and the layer information and the address information of the O to I layer are bit-inverted versions of each other;
  a group is formed by one of the I to O layer and one of the O to I layer being laminated to each other, or a group is formed by one of the combinations of two or more of the I to O layers laminated to each other and one of the combinations of two or more of the O to I layers laminated to each other being laminated to each other, and a group number is assigned to the group; and
  each of the information layers is identified by the group number and the layer information, and wherein the group number is stored in a frame different from frames that store the layer information and the address information.

15. A multilayer optical information medium comprising three or more information layers, wherein:
  address information indicating positions in each of the information layers is recorded in a helical manner;

the information layers comprise at least one I to O layer in which values representing addresses in the address information increase from an inner perimeter section toward an outer perimeter section, and at least one O to I layer in which the values representing the addresses in the address information increase from the outer perimeter section toward the inner perimeter section;

the I to O layer and the O to I layer are laminated alternately, or a combination of two or more of the I to O layers laminated to each other and a combination of two or more of the O to I layers laminated to each other are laminated alternately;

all of the I to O layers have substantially the same address information and all of the O to I layers have substantially the same address information;

each of the information layers has layer information and the address information;

the layer information and the address information of the I to O layer and the layer information and the address information of the O to I layer are sign-inverted versions of each other;

a group is formed by one of the I to O layer and one of the O to I layer being laminated to each other, or a group is formed by one, of the combinations of two or more of the I to O layers laminated to each other and one of the combinations of two or more of the O to I layers laminated to each other being laminated to each other, and a group number is assigned to the group; and each of the information layers is identified by the group number and the layer information, and wherein the group number is stored in a frame different from frames that store the layer information and the address information.

* * * * *